US012647864B2

(12) United States Patent
Ho et al.

(10) Patent No.: US 12,647,864 B2
(45) Date of Patent: Jun. 2, 2026

(54) WIRELESS LOCAL AREA NETWORK MAKE-BEFORE-BREAK HANDOVER

(71) Applicant: QUALCOMM Incorporated, San Diego, CA (US)

(72) Inventors: Sai Yiu Duncan Ho, San Diego, CA (US); George Cherian, San Diego, CA (US); Alfred Asterjadhi, San Diego, CA (US); Abhishek Pramod Patil, San Diego, CA (US); Abdel Karim Ajami, San Diego, CA (US); Yanjun Sun, San Diego, CA (US); Gaurang Naik, San Diego, CA (US); Srinivas Katar, Fremont, CA (US); Vincent Knowles Jones, IV, Redwood City, CA (US); Sandip Homchaudhuri, San Jose, CA (US); Chao Zou, San Jose, CA (US); Qiang Fan, Plainsboro, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/340,001

(22) Filed: Jun. 22, 2023

(65) Prior Publication Data

US 2024/0114415 A1 Apr. 4, 2024

Related U.S. Application Data

(63) Continuation-in-part of application No. 17/954,321, filed on Sep. 27, 2022.

(51) Int. Cl.
| | |
|---|---|
| *H04W 36/18* | (2009.01) |
| *H04W 36/02* | (2009.01) |
| *H04W 36/08* | (2009.01) |

(52) U.S. Cl.
CPC ..... *H04W 36/185* (2023.05); *H04W 36/0235* (2023.05); *H04W 36/08* (2013.01)

(58) Field of Classification Search
CPC ........... H04W 36/0033; H04W 36/185; H04W 84/12; H04W 36/08
See application file for complete search history.

(56) References Cited

U.S. PATENT DOCUMENTS

2017/0353896 A1* 12/2017 Nath .................... H04W 36/385
2019/0306774 A1* 10/2019 Cai ....................... H04W 88/06
(Continued)

OTHER PUBLICATIONS

International Search Report and Written Opinion—PCT/US2023/074495—ISA/EPO—Jan. 16, 2024.

*Primary Examiner* — Allahyar Kasraian
(74) *Attorney, Agent, or Firm* — Patterson + Sheridan, L.L.P.

(57) ABSTRACT

Certain aspects of the present disclosure provide a method for wireless communication at a wireless node, generally including communicating, via a first link, with a first access point (AP) device affiliated with a single mobility domain (SMD) entity, outputting, for transmission to the first AP device, a first message including a first indication that the wireless node is initiating a handover of the wireless node from the first AP device to a second AP device affiliated with the SMD entity, communicating with the second AP device via a second link during the handover after obtaining a second indication that context information has been transferred from the first AP device to the second AP device, and disabling the first link with the first AP device after obtaining a third indication that triggers the wireless node to disable the first link with the first AP device.

32 Claims, 23 Drawing Sheets

(56)          References Cited

U.S. PATENT DOCUMENTS

| | | | |
|---|---|---|---|
| 2021/0014911 A1 | 1/2021 | Patil et al. | |
| 2021/0092654 A1 | 3/2021 | Kadiri et al. | |
| 2021/0266931 A1 | 8/2021 | Kwon et al. | |
| 2022/0132608 A1 | 4/2022 | Chu et al. | |
| 2022/0279401 A1 | 9/2022 | Wallentin et al. | |
| 2023/0254740 A1 | 8/2023 | Sedin et al. | |
| 2024/0015826 A1 | 1/2024 | Smith et al. | |
| 2024/0064836 A1 | 2/2024 | Shafin et al. | |
| 2024/0107411 A1 | 3/2024 | Ho et al. | |
| 2024/0147318 A1* | 5/2024 | Khandavalli | H04W 36/0069 |
| 2024/0284301 A1* | 8/2024 | Elsherif | H04W 48/16 |
| 2024/0306062 A1* | 9/2024 | Verma | H04W 36/08 |
| 2026/0025657 A1* | 1/2026 | Yuan | H04W 12/06 |

* cited by examiner

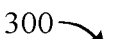
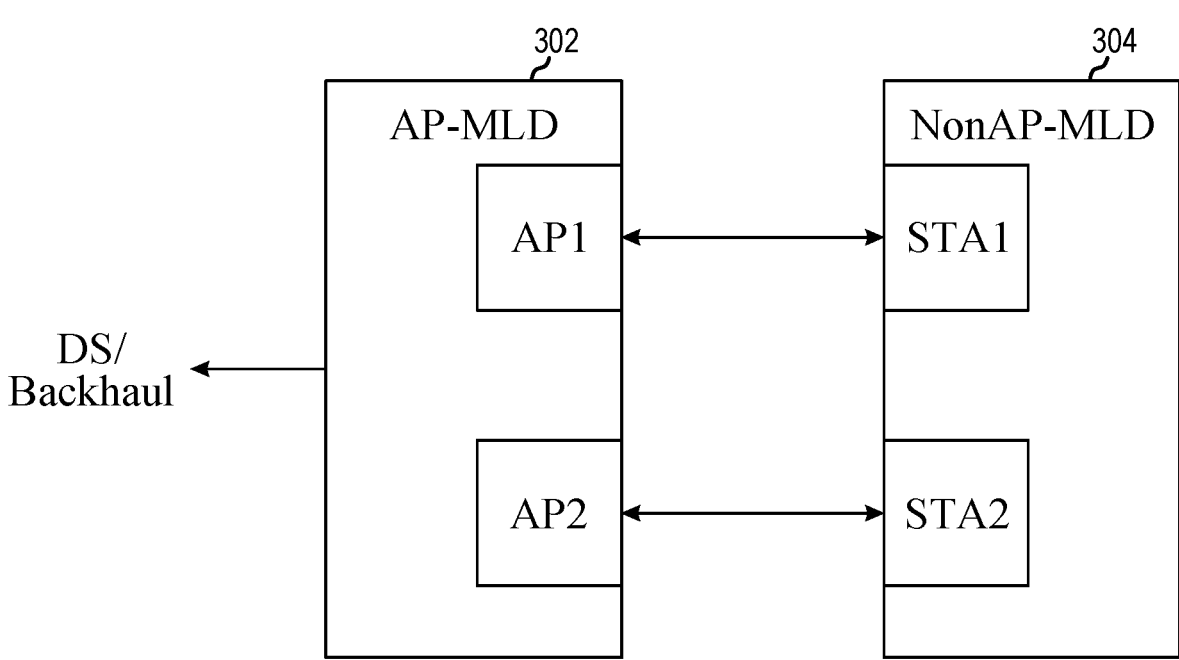
*FIG. 3*

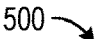
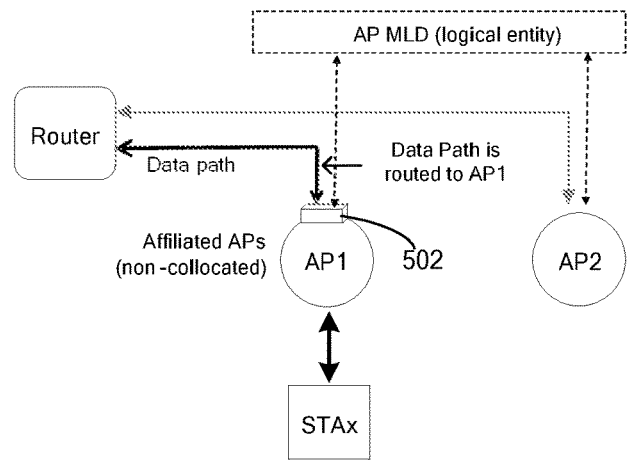
Before Transition
(AP1 has MLD
context)
*FIG. 5a*
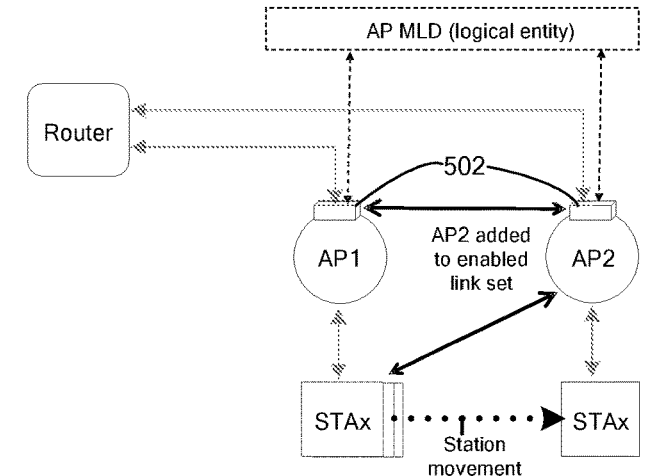
During Transition
(AP1 optionally
duplicates/forwards
packets to AP2, both
AP1 & AP2 send
packets to STA)
*FIG. 5b*
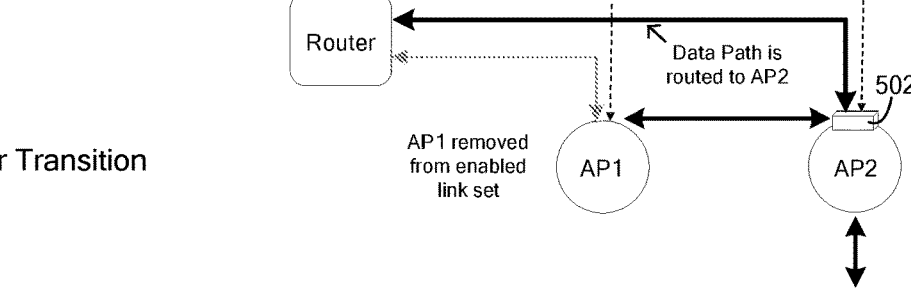
After Transition
*FIG. 5c*

600
Associated link set     502
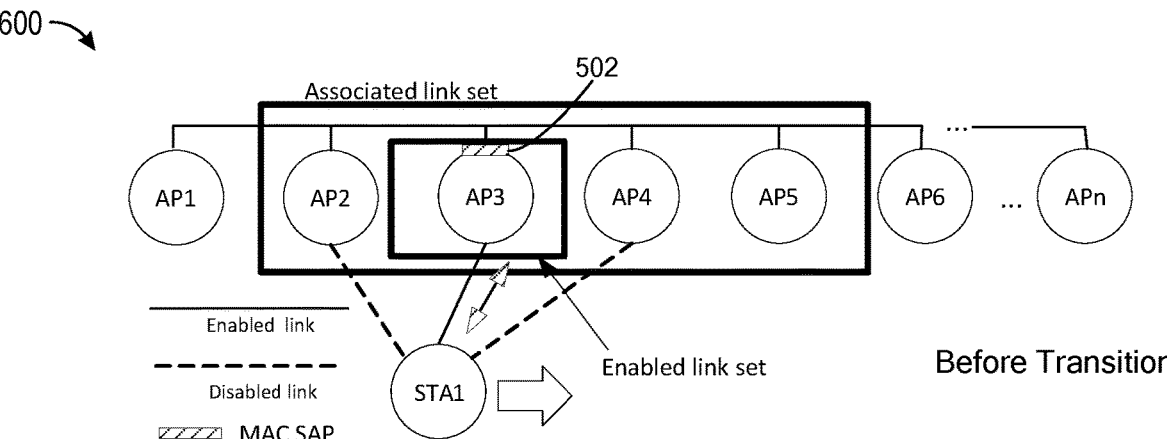
Enabled link
Disabled link
MAC SAP
Enabled link set
Before Transition
FIG. 6a
Associated link set
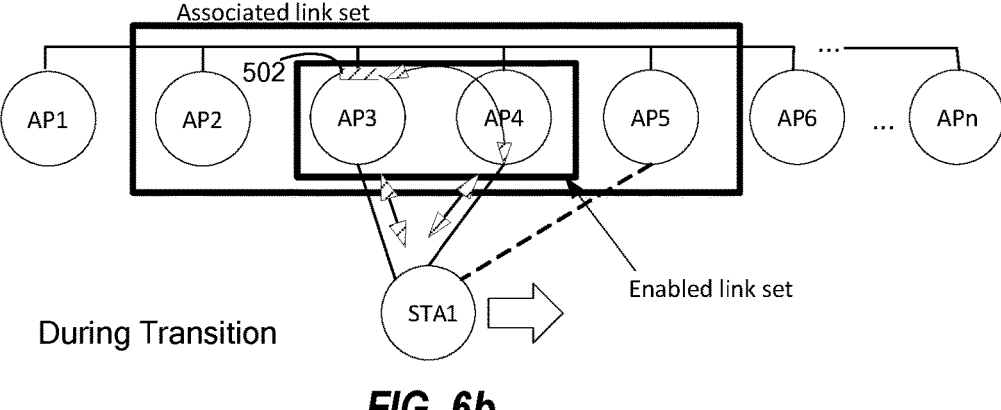
502
Enabled link set
During Transition
FIG. 6b
Associated link set     502
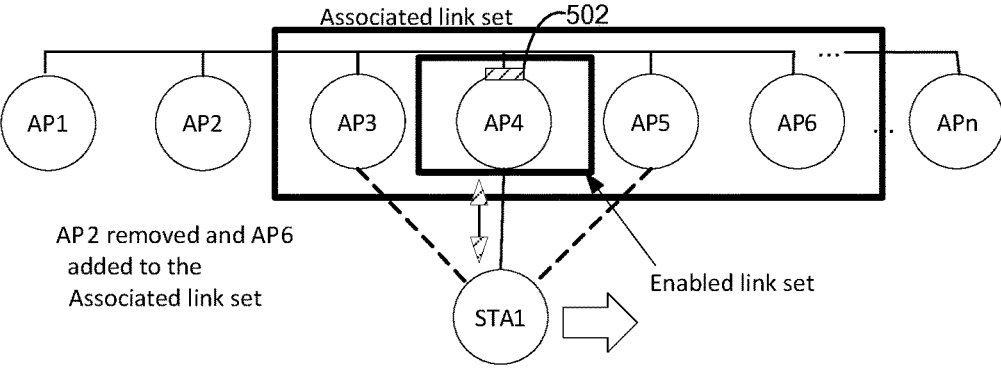
AP 2 removed and AP 6 added to the Associated link set
Enabled link set
FIG. 6c     After Transition

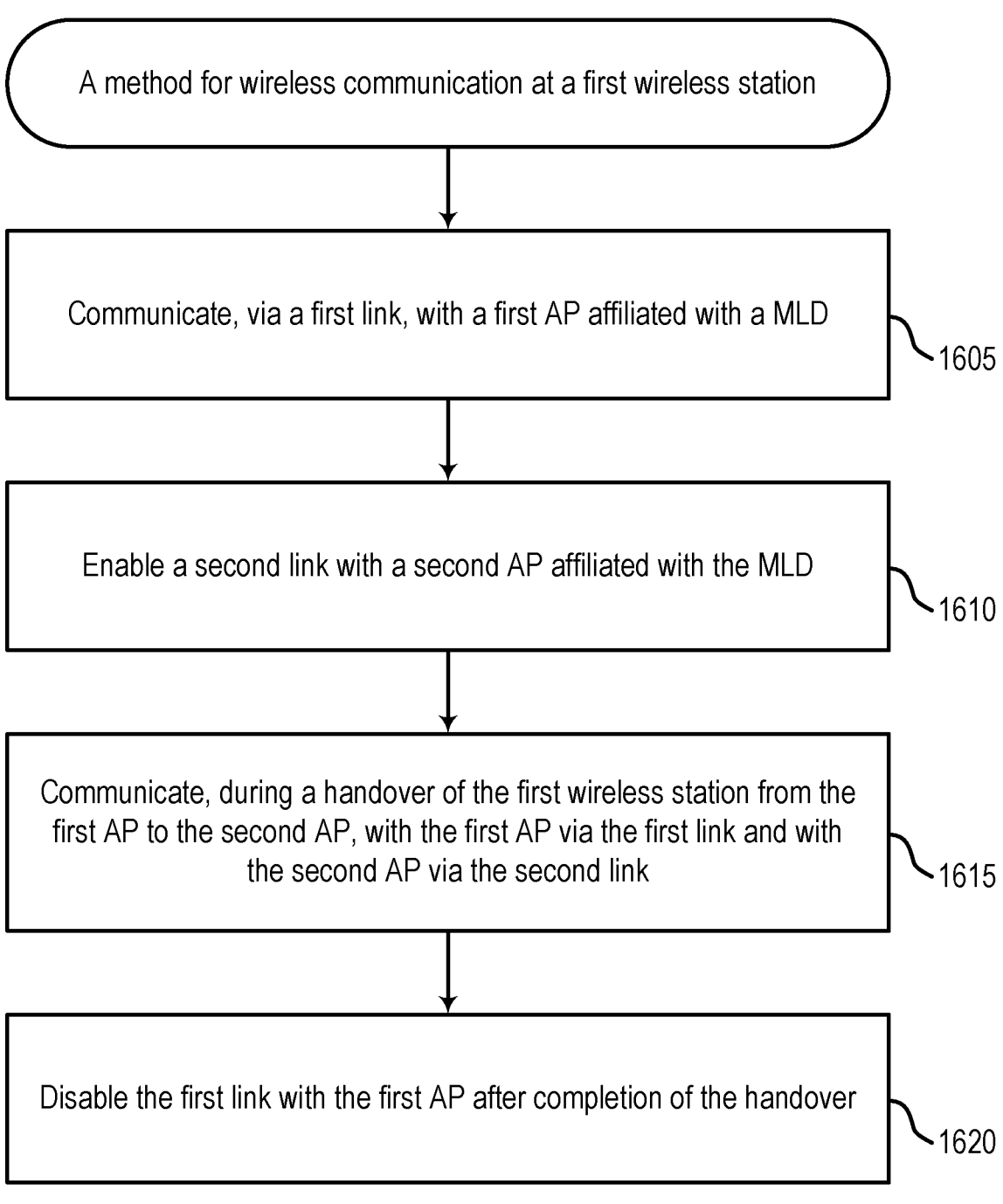

A method for wireless communication at a first wireless station

Communicate, via a first link, with a first AP affiliated with a MLD
1605

Enable a second link with a second AP affiliated with the MLD
1610

Communicate, during a handover of the first wireless station from the first AP to the second AP, with the first AP via the first link and with the second AP via the second link
1615

Disable the first link with the first AP after completion of the handover
1620

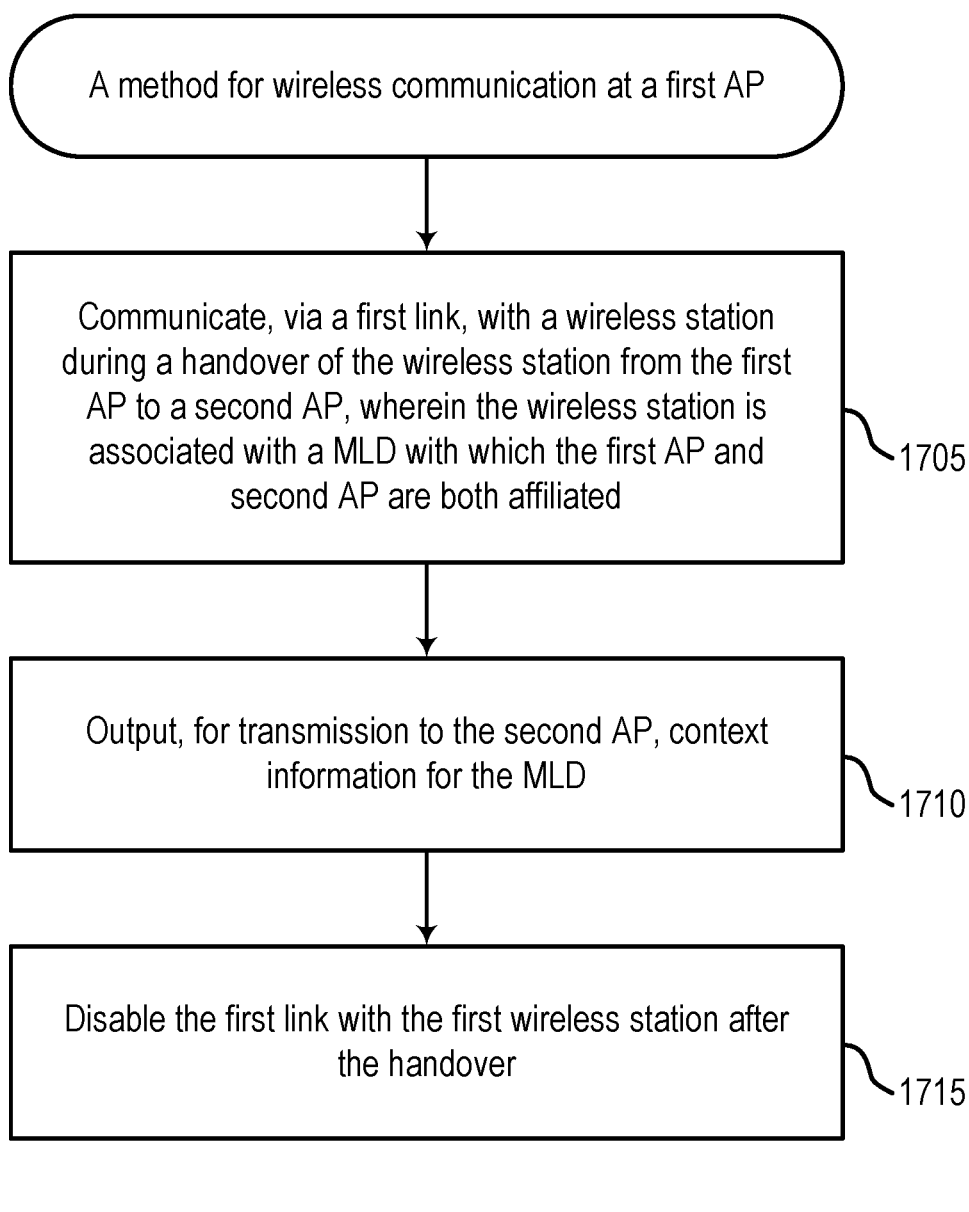

A method for wireless communication at a first AP

Communicate, via a first link, with a wireless station during a handover of the wireless station from the first AP to a second AP, wherein the wireless station is associated with a MLD with which the first AP and second AP are both affiliated
1705

Output, for transmission to the second AP, context information for the MLD
1710

Disable the first link with the first wireless station after the handover
1715

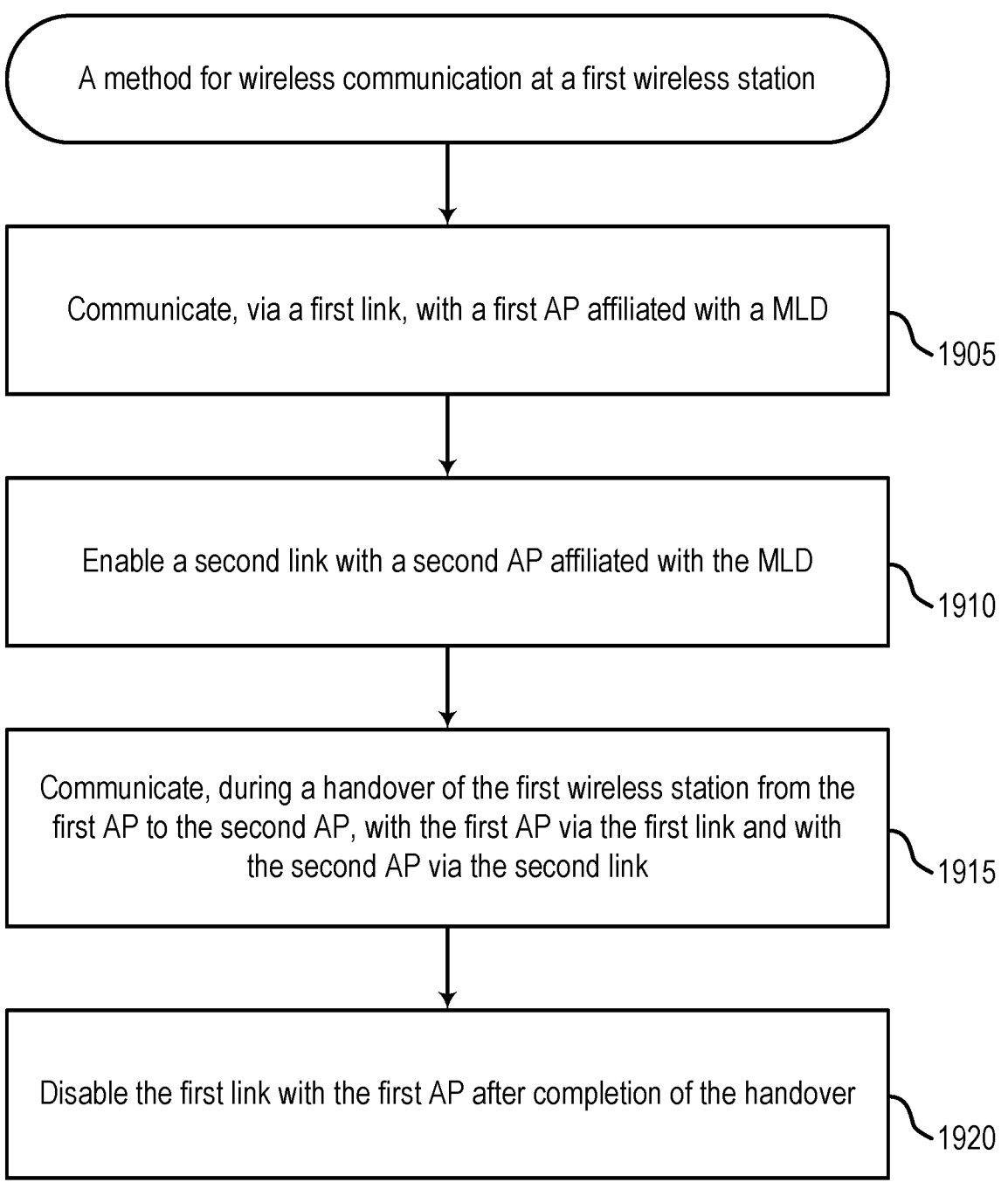

A method for wireless communication at a first wireless station

Communicate, via a first link, with a first AP affiliated with a MLD ⟩1905

Enable a second link with a second AP affiliated with the MLD ⟩1910

Communicate, during a handover of the first wireless station from the first AP to the second AP, with the first AP via the first link and with the second AP via the second link ⟩1915

Disable the first link with the first AP after completion of the handover ⟩1920

*FIG. 19*          1900

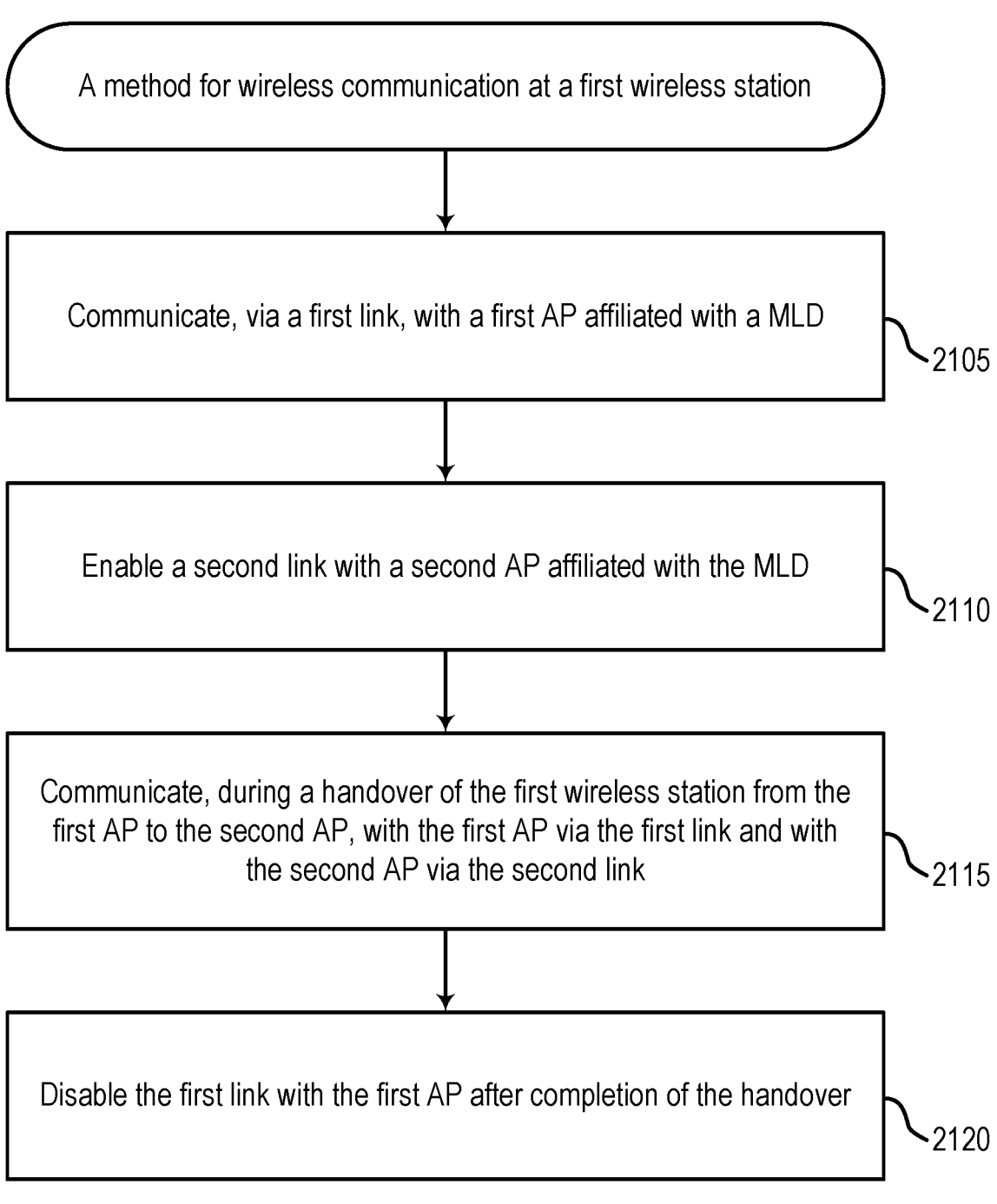

A method for wireless communication at a first wireless station

Communicate, via a first link, with a first AP affiliated with a MLD
~2105

Enable a second link with a second AP affiliated with the MLD
~2110

Communicate, during a handover of the first wireless station from the first AP to the second AP, with the first AP via the first link and with the second AP via the second link
~2115

Disable the first link with the first AP after completion of the handover
~2120

WIRELESS LOCAL AREA NETWORK MAKE-BEFORE-BREAK HANDOVER

CROSS-REFERENCE TO RELATED APPLICATIONS

This Application is a continuation-in-part of U.S. patent application Ser. No. 17/954,321, filed on Sep. 27, 2022, the entire contents of which are incorporated herein by reference.

BACKGROUND

Technical Field

Aspects of the present disclosure relate to wireless communications, and more particularly, to techniques for wireless local area network (WLAN) make-before-break handover.

Description of the Related Technology

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (such as tens of meters to a few hundred meters).

In wireless systems (such as IEEE 802.11 compliant networks), wireless stations (STAs) often roam between the coverage areas of different access points (APs). In conventional systems, as a STA roams, the STA is handed over from a source AP (currently serving the STA) to a target AP. As part of such a handover procedure, the STA typically needs to re-associate with the target AP. Re-association is typically needed before the network can switch the data path from the source AP to the target AP. Unfortunately, the re-association procedure may be relatively time consuming and interrupts data flow, which may adversely impact user experience.

SUMMARY

One aspect provides a method for wireless communication at a wireless node. The method includes communicating, via a first link, with a first access point (AP) device affiliated with a single mobility domain (SMD) entity; outputting, for transmission to the first AP device, a first message including a first indication that the wireless node is initiating a handover of the wireless node from the first AP device to a second AP device affiliated with the SMD entity; communicating with the second AP device via a second link during the handover after obtaining a second indication that context information has been transferred from the first AP device to the second AP device; and disabling the first link with the first AP device after obtaining a third indication that triggers the wireless node to disable the first link with the first AP device.

Another aspect provides a method for wireless communication at a first access point (AP) device. The method includes communicating, via a first link, with a wireless node affiliated with a single mobility domain (SMD) entity with which the first AP device and a second AP device are also both affiliated; obtaining, from the wireless node, a first message including a first indication that the wireless node is initiating a handover of the wireless node from the first AP device to the second AP device; outputting, for transmission to the second AP device, context information after obtaining the first message; outputting, for transmission to the wireless node, a second indication that triggers the wireless node to enable a second link with the second AP device; and outputting, for transmission to the wireless node, a third indication that triggers the wireless node to disable the first link with the first AP device.

Another aspect provides a method for wireless communication at a wireless node. The method includes communicating, via a first link, with a first access point (AP) device affiliated with a single mobility domain (SMD) entity; obtaining, from the first AP device, a first message including a first indication that the wireless node is to handover from the first AP device to a second AP device that is also affiliated with the SMD entity; communicating with the second AP device via a second link during the handover after obtaining or outputting, for transmission, a second indication; and disabling the first link with the first AP device after obtaining a third indication.

Another aspect provides a method for wireless communication at a first access point (AP) device. The method includes communicating, via a first link, with a wireless node affiliated with a single mobility domain (SMD) entity with which the first AP device and a second AP device are also both affiliated; outputting, for transmission to the wireless node, a first message including a first indication that the wireless node is initiating a handover of the wireless node from the first AP device to the second AP device; outputting, for transmission to the second AP device, context information after transmitting the first message; and outputting, for transmission to the wireless node, a second indication for the wireless node to enable a second link with the second AP device.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration. Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF DRAWINGS

The appended figures depict certain features of the various aspects described herein and are not to be considered limiting of the scope of this disclosure.

FIG. 3 depicts a block diagram of an example multi-link device (MLD) deployment.

FIGS. 5A, 5B and 5C depict an example make-before-break handover implemented in an MLO architecture.

FIGS. 6A, 6B and 6C depict an example associated link set and an example enable link set before, during, and after a make-before-break handover.

FIG. 16 depicts a flowchart illustrating an example method for wireless communication.

FIG. 17 depicts a flowchart illustrating an example method for wireless communication.

FIG. 19 depicts a flowchart illustrating an example method for wireless communication.

FIG. 21 depicts a flowchart illustrating an example method for wireless communication.

DETAILED DESCRIPTION

Figure 1:
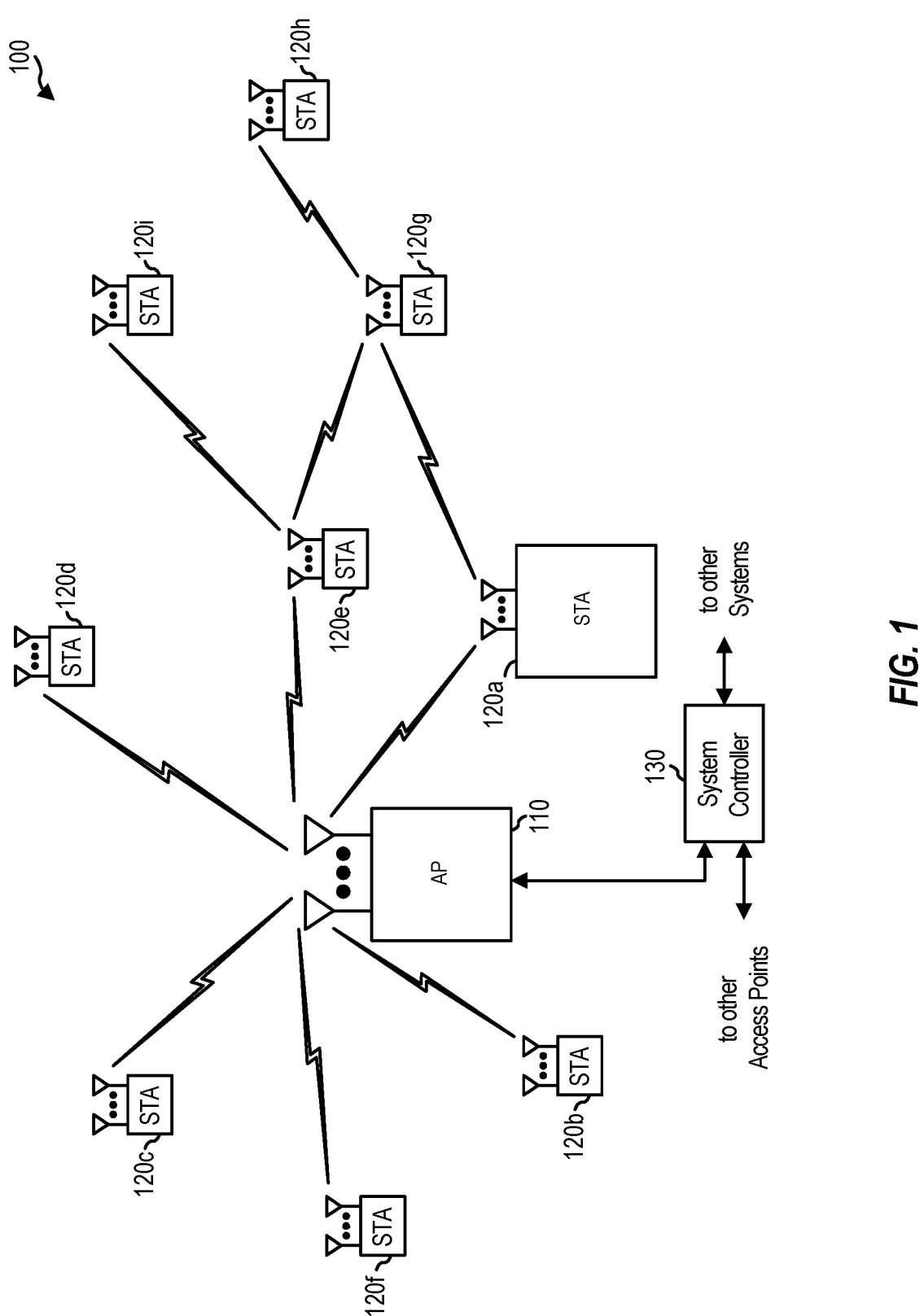
FIG. 1 depicts an example wireless communications network.

Aspects of the present disclosure provide apparatuses, methods, processing systems, and computer-readable mediums for wireless local area network make-before-break handover.

In conventional wireless communication systems, when a station (STA) roams between multiple access points (APs), the STA needs to re-associate with a new (target) AP and perform an association procedure (e.g., including a 4-way handshake procedure). The 4-way handshake procedure is the process of exchanging of four messages between an AP and a non-AP MLD to generate and exchange various encryption keys used encrypt data sent between the AP and STA. This four-message exchange may cause undue delay when a STA roams between APs, but needs to be performed before the network can switch the data path. Thus, this type of roaming or handover between APs is referred to as a break-before-make handover, because the connection to the serving AP is broken before the connection to the target AP is made, which creates data interruption and extra delay during the handover procedure.

To address this issue, techniques disclosed herein provide techniques address this issue, taking advantage of features of a multi-link operation (MLO) architecture. MLO generally refers to a feature in advanced wireless systems (e.g., such as that defined by the IEEE 802.11-2020 specification or amendments thereof including, but not limited to 802.11be Extremely High Throughput (EHT) and the 802.11 amendment associated with Wi-Fi 8)) that enables the utilization of multiple links using individual frequency channels to transmit and receive between devices. MLO may enable concurrent utilization of multiple radio links of different frequency channels/bands by an AP, a client, or both. A device capable of MLO is generally referred to as a multi-link device (MLD).

According to certain aspects of the present disclosure, non-collocated APs (i.e., APs present at different physical locations) may be connected as affiliated APs of a single AP MLD. As a result, when a STA (of a non-AP MLD) moves between these APs, the STA can bypass MLO (re)association and the 4-way handshake procedure. As a result, the technique proposed herein provide for a make-before-break handover procedure, which may avoid data interruption and reduce delay during handover.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point (AP), wireless station (STA), a non-AP STA, a non-AP multi-link device (MLD) or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes an association manager 112 that may be configured to take one or more actions described herein. The wireless station (STA) 120*a* includes an association manager 122 that may be configured to take one or more actions described herein. In aspects, AP 110 and wireless station 120*a* may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
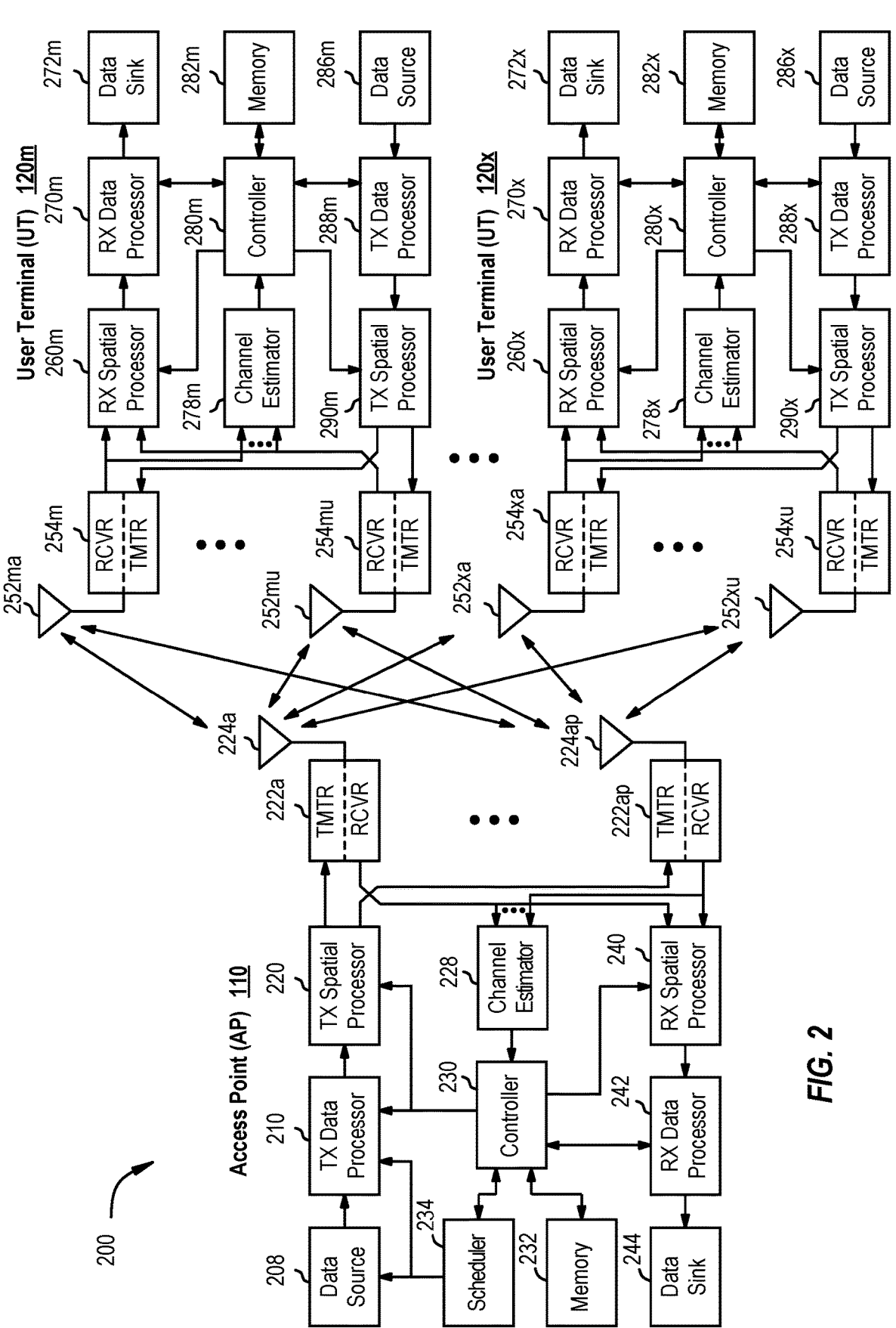
FIG. 2 depicts an example disaggregated base station architecture.

FIG. 2 illustrates a block diagram of AP 110 and two wireless STAs 120*m* and 120*x* in a MIMO/MLO system, such as system 100, in accordance with certain aspects of the present disclosure. In certain aspects, AP 110 and/or wireless STAs 120*m* and 120*x* may perform various techniques to ensure that a non-AP MLD is able to receive a group addressed frame. For example, AP 110 and/or wireless STAs 120*m* and 120*x* may include a respective association manager as described herein with respect to FIG. 1.

AP 110 is equipped with $N_{ap}$ antennas 224*a* through 224*t*. Wireless STA 120*m* is equipped with $N_{sta,m}$ antennas 252*ma* through 252*mu*, and wireless STA 120*x* is equipped with $N_{sta,x}$ antennas 252*xa* through 252*xu*. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224*a* through 224*ap* receive the UL signals from all $N_{UL}$ wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Overview of Multi-Link Devices

A multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

FIG. 3 shows a block diagram of an example MLD deployment 300. As shown in FIG. 3, an access point (AP) MLD 302 may communicate with a non-AP MLD 304. Each of the AP MLD and non-AP MLD may include at least two STA entities 314 (hereinafter also referred to simply as "STAs") that may communicate with associated STAs of another MLD. In an AP MLD, the STAs may be AP STAs 312 (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Various modes of communication may be employed in MLD implementations. For example, a MLD may communicate in an Asynchronous (Async) mode or a Synchronous (Sync) mode. The Async mode provides flexibility to adapt to channel loading, allowing an MLD to perform channel access, transmit, and receive data via multiple links asynchronously. Sync mode may be preferred, however, if RF leakage exists between channels, because synchronized transmission on all links is unaffected by RF leakage.

In the Async mode, a STA/AP may count down (for example, via a random backoff (RBO)) on both wireless links. A physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also perform a backoff countdown on multiple wireless links as part of a channel access procedure. If a first link gains access to the medium through the channel access procedure, multiple links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to that STA's tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that gains access to the medium. The other wireless link may be blocked by in-device interference greater than −62 decibels per milliwatt (dBm). No aggregation gains may be realized in this mode.

Aspects Related to Wireless Local Area Network Make-Before-Break Handover

Aspects of the present disclosure provide apparatuses, methods, processing systems, and computer-readable mediums for wireless local area network make-before-break handover.

As noted above, conventional wireless communication systems typically only support a break-before-make handover procedure, requiring a STA to perform an association procedure when roaming between multiple APs. This approach creates data interruption and extra delay during the handover procedure.

Aspects of the present disclosure, however, support a make-before-break handover procedure, which may avoid data interruption and reduce delay during handover.

Figure 4:
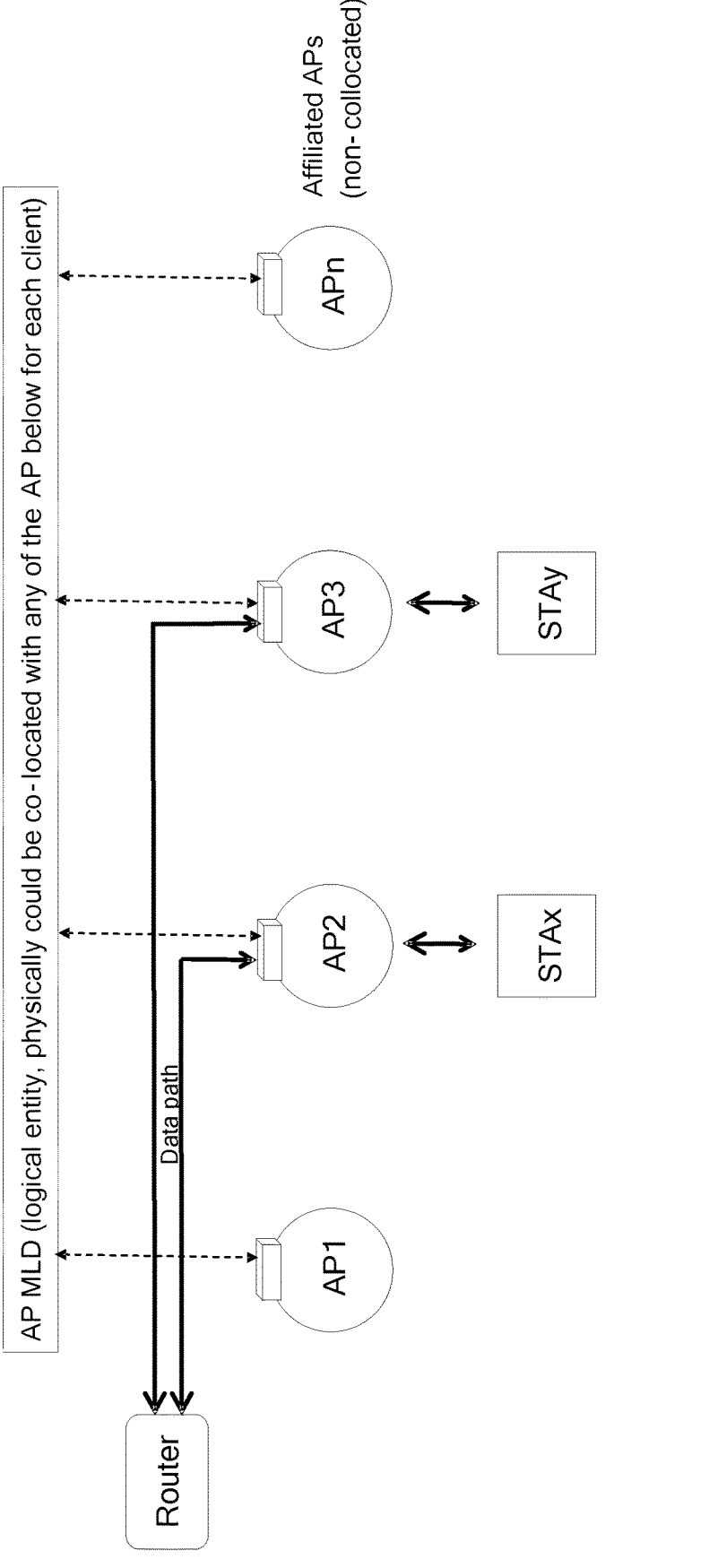
FIG. 4 depicts an example multi-link operation (MLO) architecture.

Aspects of the present disclosure may be implemented, for example, in the architecture multi-link operation (MLO) architecture illustrated in FIG. 4. The MLO architecture of FIG. 4 may allow non-collocated APs to be affiliated with a single AP MLD 402. In this manner, an AP MLD may be considered a logical entity which is collocated physically with any of a set of non-collocated APs 412 affiliated with the AP MLD.

FIGS. 5A-5C illustrates example operations before, during, and after a make-before-break handover, in accordance with aspects of the present disclosure.

As illustrated in FIG. 5A, before the handover, a STA (e.g., STAx) within the MLO architecture has an active link with only a serving AP (AP1). At this point, the link with AP1 is in the only link in an enabled-link set and the data path is routed to AP1. AP1 hosts MLD context 502 for the client (e.g., STAx). While AP1 and the target AP (AP2) are collocated and may be affiliated within an associated link set, AP2 is not in the enabled-link set at this point.

As illustrated in FIG. 5B, however, as STAx moves towards AP2, the link to AP2 may be enabled during the make-before-break handover. This transition may occur where, as illustrated, the STAx moves closer to AP2. At this point, AP2 is added to the enabled link set alongside AP1 and both AP1 and AP2 exchange packets to client (as the link with AP2 was made before the link with AP1 was broken). Optionally, AP1 duplicates/forwards packets to AP2 as part of the transition.

As illustrated in FIG. 5C, after the transition, AP1 is removed from the enabled link set and the data path re-routed to AP2. At this point, AP2 hosts the MLD context for the client.

By implementing the multi-AP association described herein, data disruptions (e.g., MSDUs loss, duplicated MSDUs, or out-of-order MSDUs delivery) during handover may be mitigated. Thus, issues of delay and disruption present in typical MLO re-association or 4-way handshake procedures are avoided. Instead, there is minimal interruption and delay on the data path during handover. The multi-AP association also does not require association/association, or the related security steps. Implementation of the multi-AP association may allow mobility among a large number of APs (e.g., a single floor covered with 50 APs in an enterprise network).

According to aspects of the present disclosure, the make-before-break handover may be implemented within a multi-link architecture according to certain extensions In one example, certain mechanisms may be allowed for the client (e.g., a STA) to associate with a subset of the APs (associated link set), and then add/remove APs to the associated link set. In this case, it is not scalable for a non-AP MLD (e.g., a STA) to request and set up all the links at the same time. When a STA is deployed, only some of the APs are within range of the STA, so not all the links can be used concurrently, thus simultaneous set-up may not be necessary. Accordingly, an associated link set defined for a given STA may allow for better multi-AP association within the multi-link architecture.

In another example, certain mechanisms may be enabled for distribution system (DS)/Backhaul to connect directly to the AP(s) serving the client (STA). This may imply that the backhaul/DS point of attachment moves when the client moves from an AP to another AP.

As noted above, multiple non-collocated APs within a network topology may be affiliated with a single AP MLD. There may be a large number of APs. For example, all APs in one company floor may belong to the same AP MLD. The non-AP MLD (e.g., STA) performs handover as it moves across the company floor.

According to certain aspects, MLO association and authentication may be implemented to enable a non-AP MLD to associate with the AP MLD. For example, 11be ML discovery may be extended and ML authentication and association, Pairwise Transient Key Security Association (PTKSA), block acknowledgment (BA), and the like, may be reused. In certain cases, an affiliated AP may advertise its neighboring APs in its beacon (and these neighboring APs may be identified as potential handover targets by a STA).

As illustrated in FIGS. 6A-6C, according to certain aspects, an associated link set may be maintained. An associated link set is a subset of the affiliated that are currently "associated" with the non-AP MLD. To maintain the associated link set, an affiliated AP may be added to the associated link set once it's in range (with threshold/time hysteresis). AN affiliated AP may be removed from the set once it's out-of-range (with threshold/time hysteresis). For example, existing 11be ML link reconfiguration may be used to add/remove link(s) dynamically without (re-)association. The enabled link set described herein is a subset of the associated link set.

FIGS. 6A-6C illustrate an example associated link set and an example enable link set before, during, and after a make-before break handover. In the example, STA1 (a non-AP MLD) moves to the right.

FIG. 6A illustrates an example associated link set and an example enable link set before the make-before-break handover. Here, AP2-AP5 are part of the associated link set. In this example, AP3 is currently serving the STA, so that (the link to) AP3 is the only member of the enabled link set and hosts the MDL context 502.

As illustrated in FIG. 6B, as the STA moves, a link to AP4 is enabled, without breaking the link to AP3. Here, the redundant link may be used for duplicated data exchange during handover.

As illustrated in FIG. 6C, after the handover, MLD context 502 is relocated from AP3 to AP4. In this example, AP3 is removed from the enabled link set, AP2 is removed from the associated link set, and AP6 added to the associated link set.

According to certain aspects, pre-handover preparation may occur on the network side. In some cases, an AP MLD may detect the presence of handover conditions. In other cases, handover can be triggered by the non-AP MLD itself (e.g., use auxiliary radio to look for target APs). Once handover is decided, network can initiate the handover transition stage. During the handover transition stage, duplicated packets may be sent on multiple links for reliability and reduced delay. Existing 11be MLD procedures and signaling may be used to remove any duplicated packets. The MLD context (e.g., association, authentication, BA) may be relocated to the new (anchor) AP and duplicated transmission may be terminated.

Implementation of techniques described herein may reuse certain existing 11be mechanisms. For example, ML setup (e.g., association and authentication, PTKSA, BA, and the like) and ML reconfiguration (to add/remove link(s)) for the enabled link set may be reused. Additionally, an AP beacon may include neighboring APs. The associated link set may be maintained. The medium access control (MAC) serving AP (SAP) and MLD context may be maintained.

Figure 7:
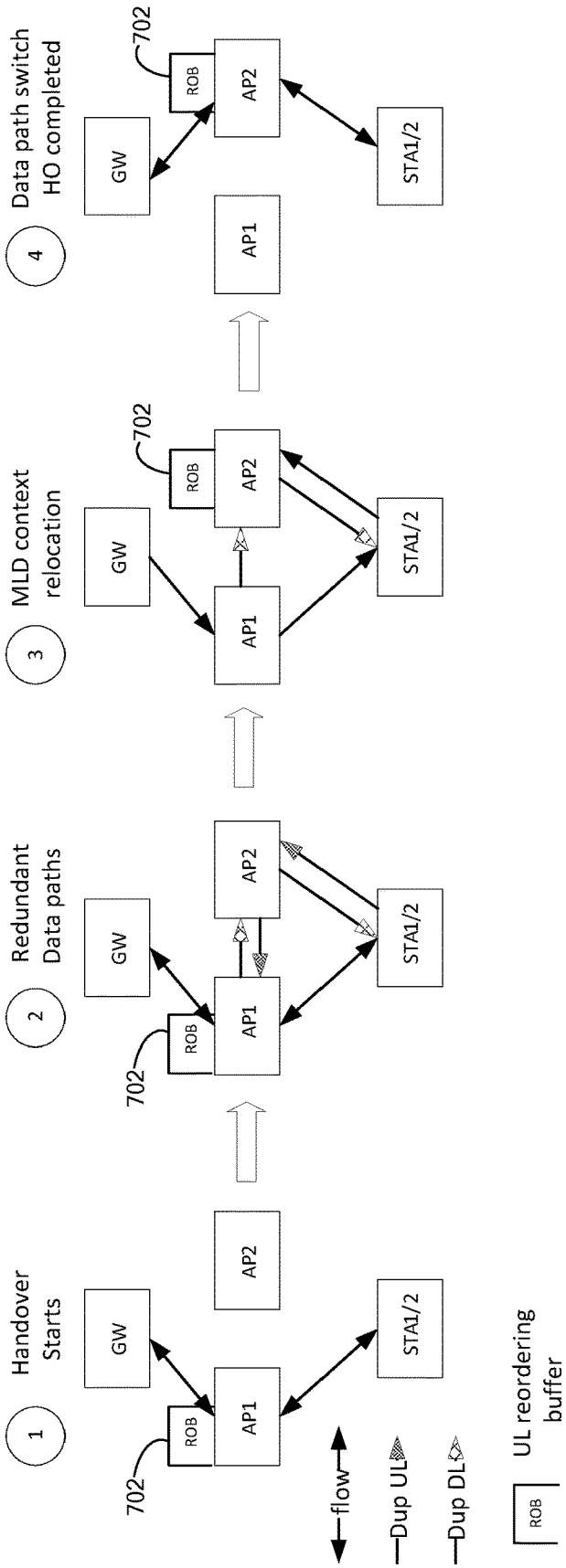
FIG. 7 depicts an example transfer of multi-link device (MLD) context including a handover buffer during a make-before-break handover.

An example make before break-procedure is illustrated in FIG. 7. As illustrated, in an initial state (1), a gateway (GW) 704 may be connected to AP1, and all traffic goes through AP1. In this example, AP1 has an uplink (UL) reordering buffer (ROB) 702.

As shown at (2), handover to AP2 begins. First, downlink (DL) duplication is initiated where AP1 may start to duplicate DL packets, by forwarding the DL packets to AP2. Upon receipt, AP2 sends the DL packets to STA2. UL duplication may also begin when STA2 starts to duplicate UL packets and sends the dup to AP2, for example, over-the-air (OTA Sig 1). In one case, AP2 buffers all UL packets received at the ROB, without forwarding the packets to the gateway (otherwise, the packet may be received out of order at the gateway). In an alternative case, AP2 forwards all received UL packets to AP1 for reordering.

As shown at (3), after UL packets are forwarded, the MLD context may be relocated. MLD context location is based on agreed timer and an UL sequence number (SN) value, among other things. MLD context may comprise any of association context, security context, block-ACK (BA) sessions, TID-to-link mapping, a DL packets buffer, the ROB, and PN (packet number). During the MLD context relocation, AP1 terminates sending UL packets to gateway, then sends the MLD context to AP2, while STA1 may stop transmission to AP1 (OTA Sig2).

After relocation, at (4), AP2 may receive uplink packets and combine them with its local RO buffer. AP2 starts to send UL packets to the gateway, while AP2 stops forwarding UL packets to AP1 (if it has been forwarding the packets to AP1). In some cases, AP2 sends a "switch path layer 2 (L2) message" to the gateway, and the gateway switches data path to AP2. To finish the handover procedure, AP2 may send a handover "done msg" to AP1. AP1 stops DL transmission and clears any unsent DL packets.

Figure 8:
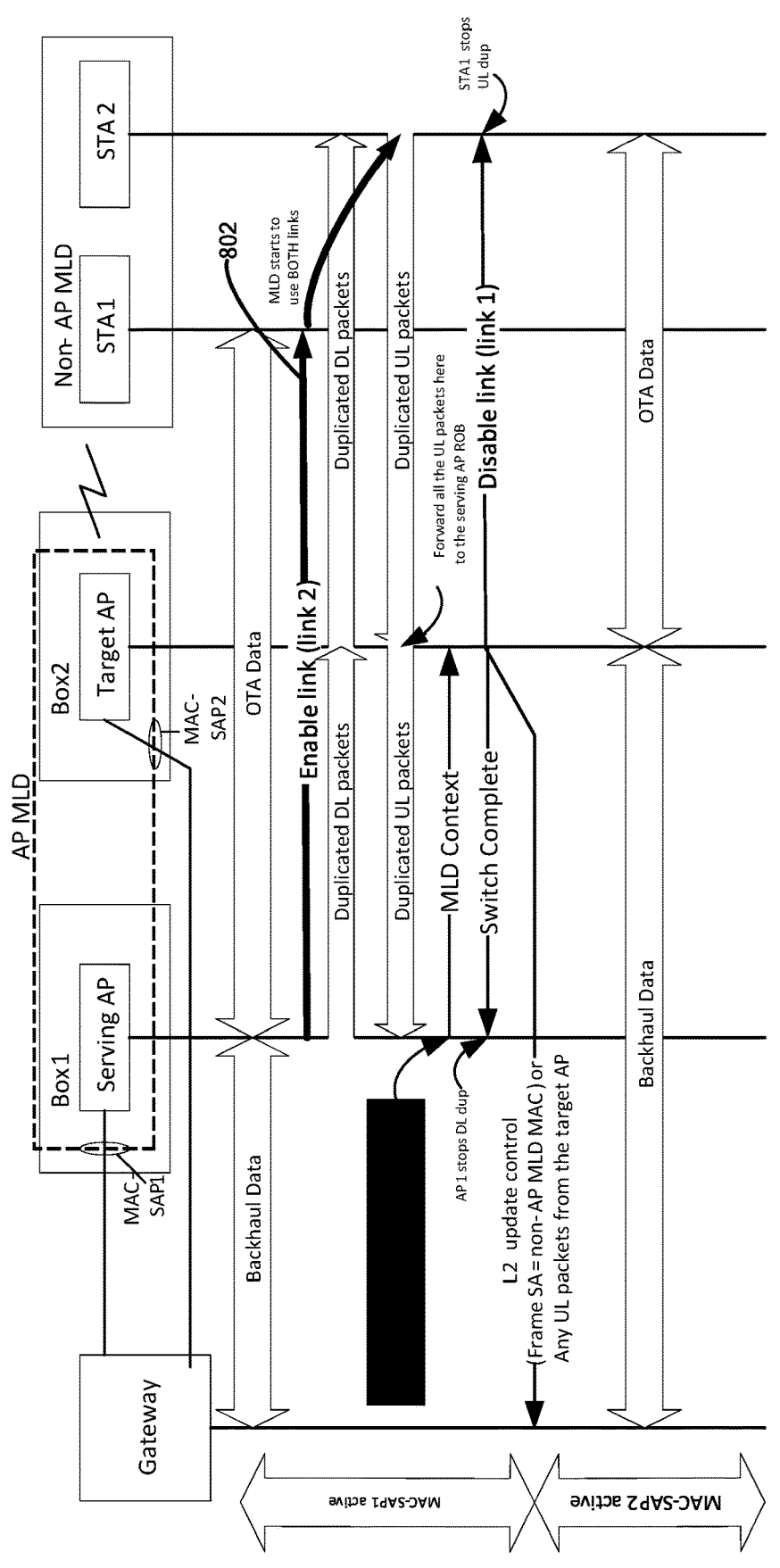
FIG. 8 depicts an example call flow for a network initiated make-before break handover.
Figure 9:
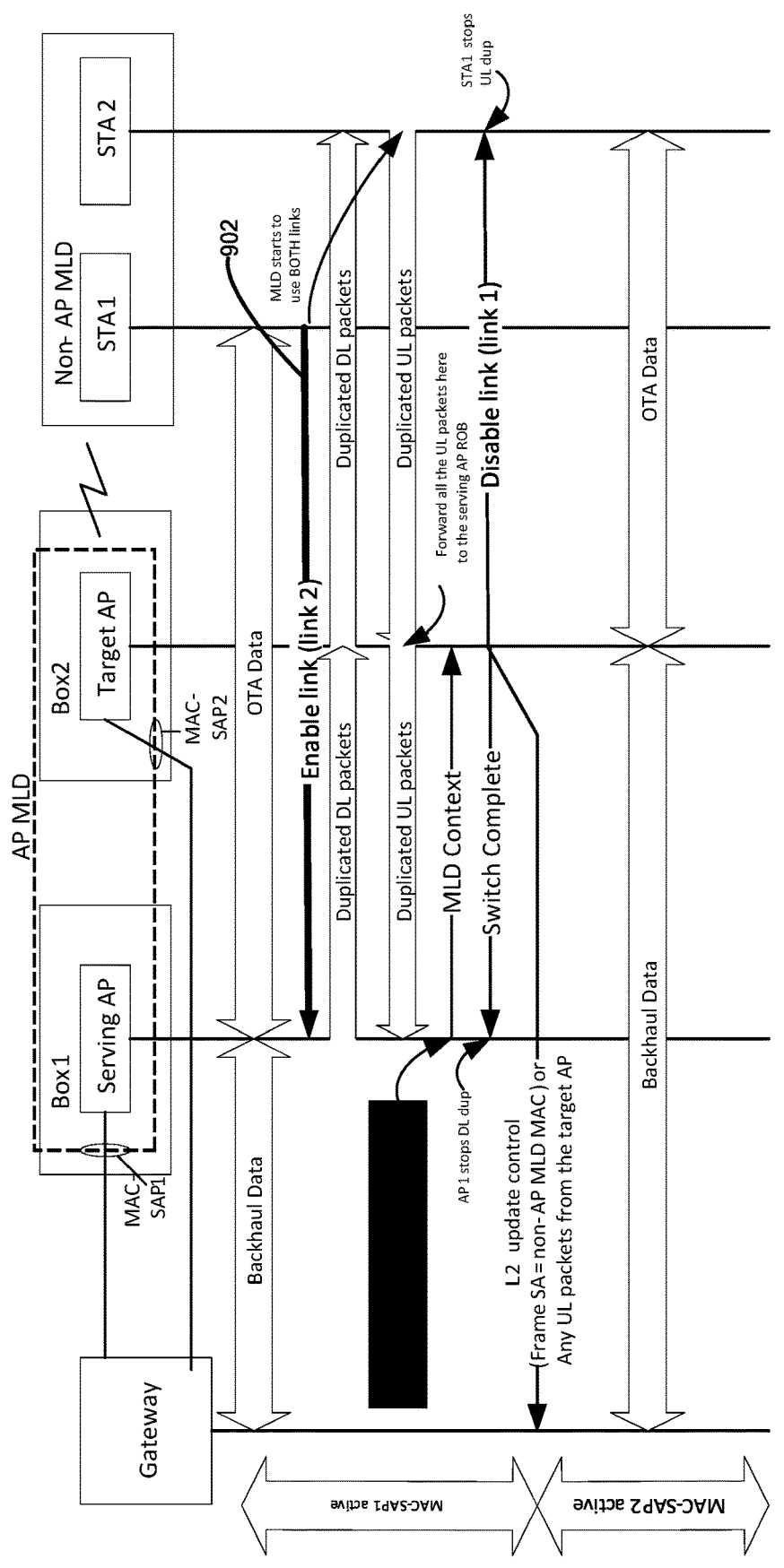
FIG. 9 depicts an example call flow for a client initiated make-before break handover.

As illustrated in FIG. 8 and FIG. 9, respectively, make-before-break handover may be initiated by the network or the client, respectively.

As illustrated in FIG. 8, assuming an initial state where the Non-AP MLD STA(s) are served by a serving AP (located at Box 1). In this case, the serving AP may initiate the handover by sending a message for the STA to enable a link to the target AP (in Box 2). The operations then proceed as discussed above, where the MLD starts to use both links during the handover. To signal an end of the handover, the target AP may send a message for the STA to disable Link 1 to AP1 and may send a message to AP1 that the switch is complete.

As illustrated in FIG. 9, for the client-initiated make-before-break handover procedure, the STA may send a message to the Serving AP to enable Link 2 to the Target AP. The other operations may proceed as described above, with reference to the network-initiated make-before-break handover procedure.

Aspects Related to Data Path Switching

Certain aspects of the present disclosure provide techniques that may help enable seamless roaming of a client between APs without re-association. This is beneficial because re-association typically results in a reset of block acknowledgment (BA) sequence numbers (SNs) and can cause packet-loss. The techniques proposed herein may result in zero or minimal packet-loss.

The techniques proposed herein may help improve user experience, in some cases, without significant changes to backhaul signaling and corresponding controller operation. The techniques may consider different types of traffic, such as XR traffic that can tolerate some packet loss, as well as file transfer scenarios that cannot typically tolerate packet loss.

The techniques may be applied to perform data path switching for various scenarios. These scenarios may include break-before-make handovers, in which no data forwarding is performed. In such cases, packet delivery during transition (from a source AP to a target AP) may be best-effort based, allowing the source AP to drain packets (e.g., from a downlink queue), while the target AP is set up. This best-effort approach may result in packet drops. These scenarios may also include partial make-before-break handovers with MSDU-level forwarding (with some potential MPDU-level packet drops), full make-before-break handovers with MPDU-level and MSDU-level forwarding, and scenarios with simultaneous packet delivery from multiple APs.

As will be described in further detail below, the data-path switching proposed herein may involve the transfer of management and context between the source and the target APs. This management context may include information regarding security and association of the station. The data context may include information regarding traffic, such as a Sequence number and packet number.

The techniques proposed herein may be applied in various scenarios, including station-initiated (or client-initiated) handover scenarios and network-initiated handover scenarios. The techniques proposed herein may also be applied to handover scenarios involving devices of different capabilities, such as single radio stations and multi-radio stations.

As used herein, handover generally refers to the process of a wireless node moving from one (physically distinct) serving AP device, referred to as a source AP, to another serving AP device, referred to as a target AP. Other terms may also be used to refer to the same or a similar process, such as seamless roaming.

A wireless node being handed over (or roaming) from a source AP to a target AP could be any type of device that supports handover or seamless roaming, such as a non-AP MLD or a non-AP STA (e.g., a client device). The source AP and/or target AP could be any type of AP device, such as a standalone AP or an AP MLD.

In the handover scenarios described herein, the source AP and target AP may both be affiliated with a single mobility domain (SMD) entity, such as an SMD AP MLD. In this context, an SMD entity generally refers to a logical entity that comprises more than one non-collocated AP device such that a non-AP device that is associated with the SMD entity can seamlessly roam (e.g., without requiring reassociation) between the AP devices affiliated with the SMD entity. In this context, an AP device (affiliated with an SMD entity) can be an AP MLD which comprises one or more affiliated APs or a single link AP. A non-AP device can be a non-AP MLD which comprises one or more affiliated non-AP STAs or a single link non-AP STA.

The source AP and target AP may be affiliated with different (normal or non-SMD) AP MLDs. An SMD AP MLD may be similar to a normal AP MLD, in that it may control multiple APs affiliated therewith. One difference, however, is that APs affiliated with the SMD AP MLD may be in different locations (non-collocated), while APs affiliated to a same normal AP MLD are typically in the same location (collocated).

One example of an SMD entity is an SMD MLD, which may refer to a logical entity that can reside, for example, on a network controller or a serving AP MLD for a particular client. For the latter case, the physical AP that provides (activates/operates) SMD MLD functionality can be different for different clients and therefore the physical location of SMD MLD can be different for different clients. Further, some operations or functionality can be split between an AP MLD and an SMD MLD. For example, functionality related to association context, block acknowledgment (BA), and/or security may reside on the SMD MLD for a particular client, while other functionality related to a Link ID may be based on the serving AP MLD. This is in contrast to a conventional station (e.g., a legacy client) such as an 802.11 be compliant non-AP MLD, where such functionalities may all reside on the physical AP MLD that is serving the that non-AP MLD. While the present disclosure refers to an entity that provides the functionality described above as an SMD MLD, entities providing the same or similar functionality may be referred to by other names.

Figure 10:
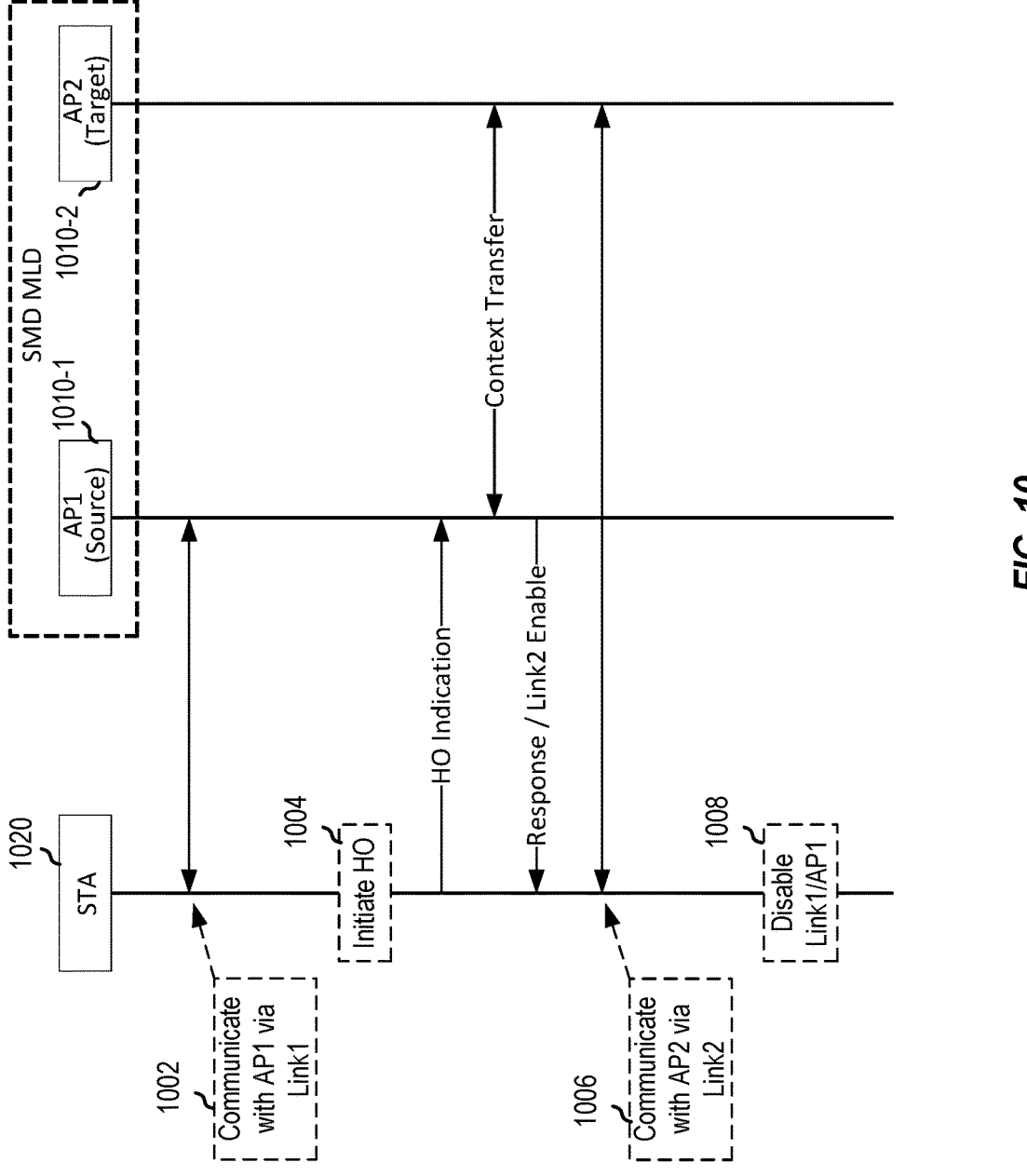
FIG. 10 depicts an example call flow for a station initiated handover, in accordance with certain aspects of the present disclosure.

FIG. 10 depicts an example call flow 1000 for a station initiated handover, in accordance with certain aspects of the present disclosure. The example assumes a client station (STA) 1020 that initiates a handover from a source AP (AP1 1010-1) to a target AP (AP2 1010-2), that are both affiliated with an SMD MLD.

As illustrated at 1002, the STA may initially be in communication with AP1 via a first link, Link1. As illustrated at 1004, the STA may initiate a handover (HO), and may send an HO indication to AP1. As will be described below, the HO indication may be sent in a message referred to as a roaming announcement initiation (RAI) message. Some other type of message referred to by a different name (other than an RAI message) may also convey an HO indication or similar type of signaling announcing initiation of a handover or seamless roaming.

After receiving the HO indication, AP1 may transfer context to AP2, to prepare AP2 to serve the STA. As noted above, the context may include management and data context. In some cases, AP1 may indicate the context transfer has been performed, for example with a response to the HO indication, which may also indicate a second link (Link 2) is enabled. As illustrated at 1006, after receiving the response, the STA may communicate with AP2 via Link 2. As illustrated at 1008, the STA may disable Link 1 with AP1.

Figure 11:
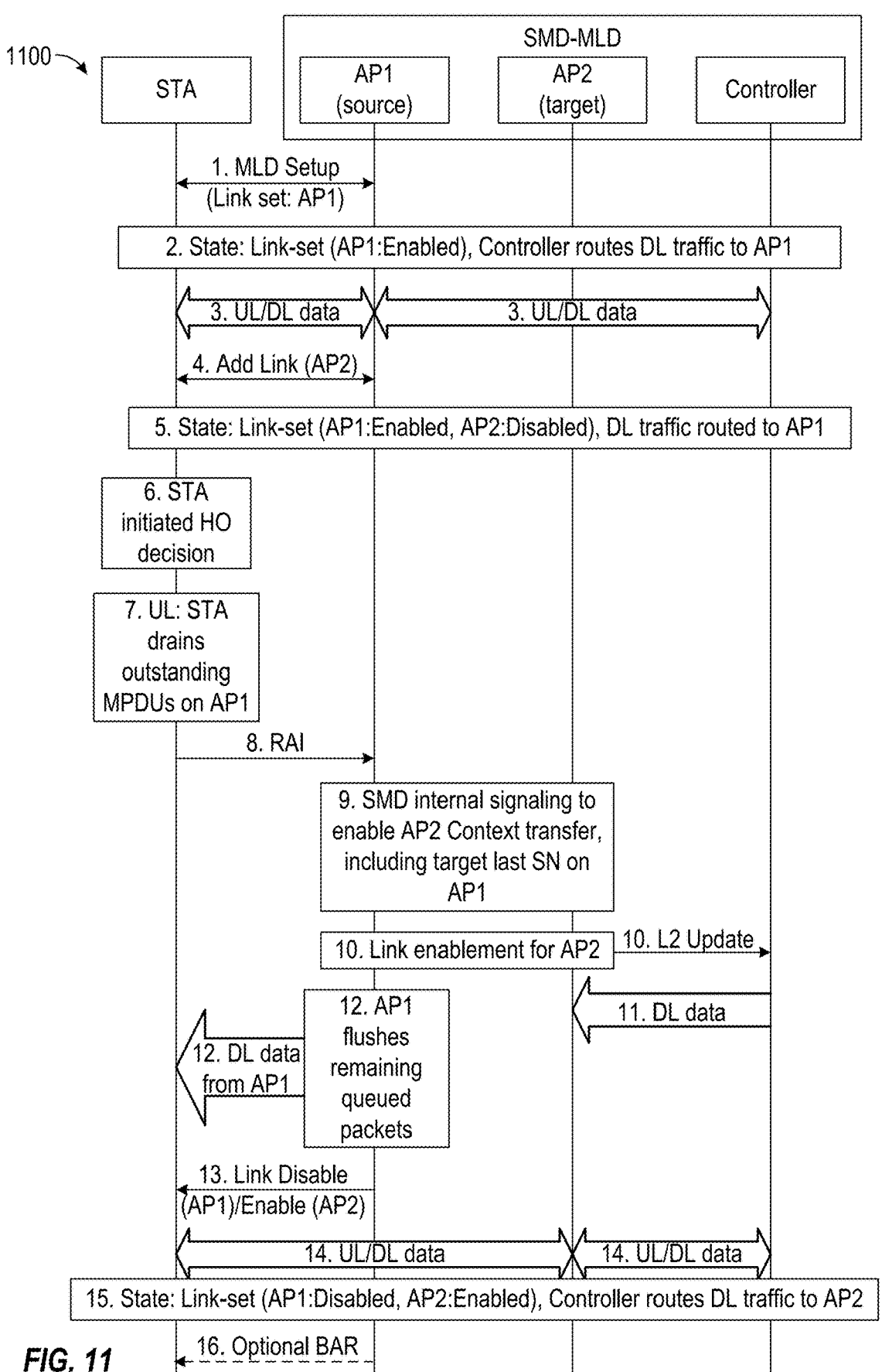
FIG. 11 depicts an example call flow for a station initiated handover in a single radio scenario, in accordance with certain aspects of the present disclosure.
Figure 12:
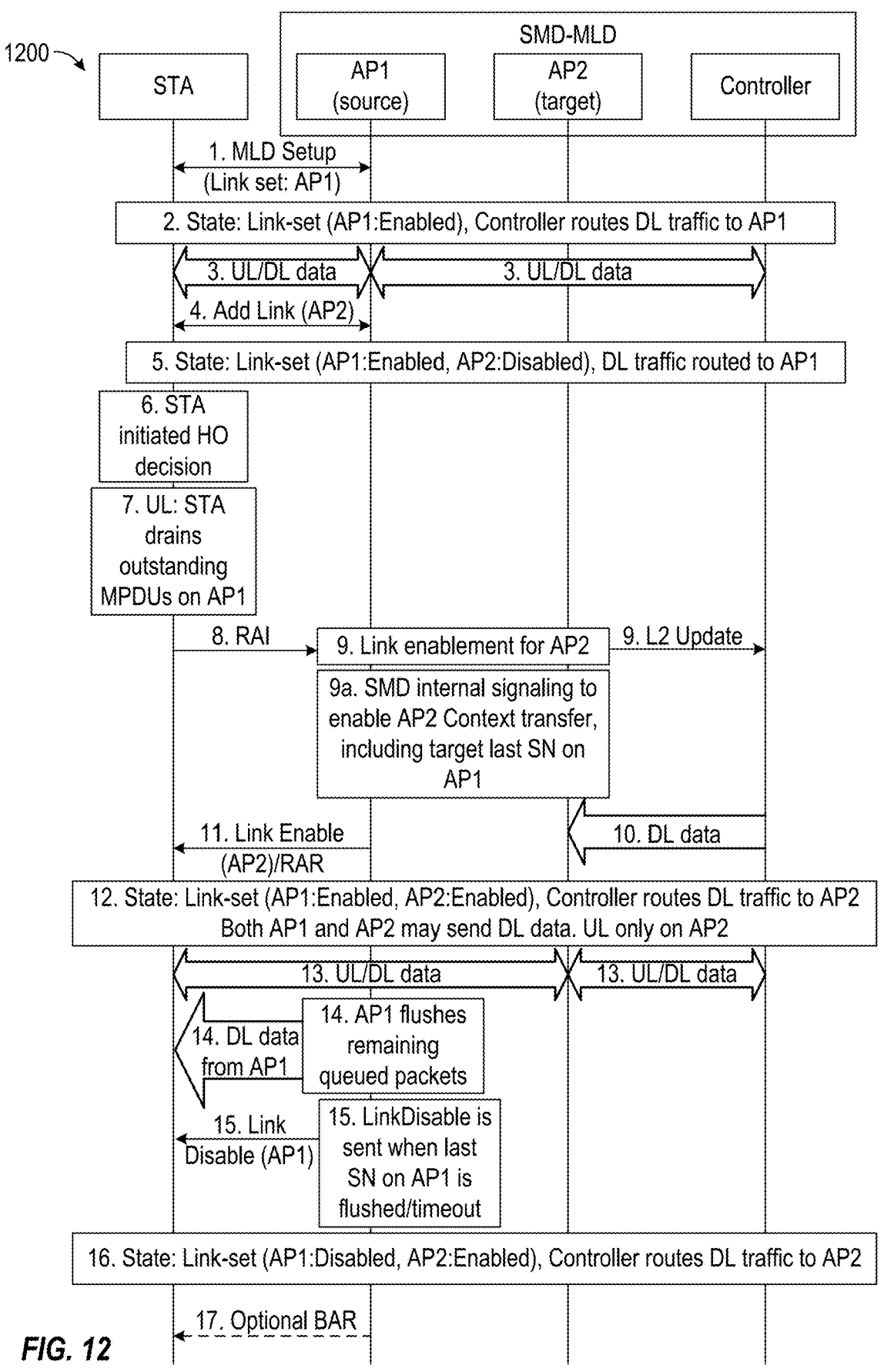
FIG. 12 depicts an example call flow for a station initiated handover in a multi-radio scenario, in accordance with certain aspects of the present disclosure.

While the call flow diagram 1000 is a relatively high level depiction of a client initiated HO, call flow diagrams 1100 of FIGS. 11 and 1200 of FIG. 12 provide additional signaling details for examples scenarios assuming a single radio STA and multi-radio STA, respectively. For example, call flows 1100 and 1200 include additional details regarding interactions between AP1 and AP2 with a controller of the SMD MLD. The controller may be an example of the system controller 130 of FIG. 1. The controller may generally serve to manage APs affiliated with the SMD AP MLD, for example, managing the addition and removal of APs to the SMD AP MLD. The controller may also serve to route data between the network and the STA, via the APs affiliated with the SMD AP MLD. The signaling mechanisms presented herein may allow for data path switches as a STA moves between source and target APs with little or no packet loss, without significant changes to the controller or backhaul signaling.

FIG. 11 depicts an example call flow 1100 for a station initiated handover in a single radio scenario, in accordance with certain aspects of the present disclosure. The example assumes a STA 1120 initiates a handover from source AP1 1110-1 to a target AP2 1110-2, that are both affiliated with an SMD MLD. The call flow 1100 of FIG. 11 includes some additional details relative to the call flow of FIG. 10, such as the interactions between AP1 1110-1 and AP2 1110-2 with a controller 1130 of the SMD MLD.

As illustrated at (1), an MLD setup is performed and a link is established between the STA and AP1. For example, during MLD setup may involve a signaling exchange between the STA and AP1 to negotiate capabilities and operating parameters for one or more links. As illustrated at (2), in a first state after the MLD setup, a link with AP1 is enabled and the controller routes DL traffic to AP1. As illustrated at (3), in this state, UL traffic is also routed from the STA to the controller via AP1. As illustrated at (4) and (5), a link may be added for AP2, resulting in a second state, with a link set of AP1 enabled and AP2 disabled, where the controller still routes DL traffic to AP1. Adding this link for AP2, while the link with AP1 is still enabled, may help reduce latency when the STA is actually handled over to AP2 with little or no packet loss.

As illustrated at (6), the STA may decide to initiate a HO. The decision may be based on a trigger, such as a change in channel conditions or some traffic-related metric as the STA moves (e.g., away from AP1 towards AP2). In some cases, as illustrated at (7), the STA may drain outstanding MPDUs to AP1 (e.g., to flush an UL queue).

As illustrated at (8), in response to the HO decision, the STA may send a Roaming Announcement Initiation (RAI) message. The RAI message may be sent as a separate/dedicated frame (e.g., a management/control frame), in a data frame, and/or as part of a header (e.g., in an A-CTL field). In some cases, the RAI may have information on how long the STA can communicate with the current AP before moving. This may be referred to as a handover deadline (HO_deadline).

As illustrated at (9), context transfer to AP2 may be enabled via SMD internal signaling. The context information may include, for example, a target last SN on AP1. This information may allow AP2 to know and/or determine a start SN when it starts serving the STA. The target last SN may be used by AP2 to determine which packets to begin with when AP2 starts to serve the client. AP1 may indicate a target last SN based on the assumption that there is no MPDU level forwarding, so MSDUs are coming to AP2 and AP2 needs to use a new SN and needs to know where to start. To determine the target last SN, AP1 may make a prediction of the last SN AP1 will deliver to the STA. For example, AP1 may assume, in a worst case scenario, a same SN (assuming no more packets were successfully delivered), or could pick a lower SN, for example, if multiple MPDUs aggregated in an aggregated MPDU (AMPDU). As described below, a BAR from AP1 may address this issue, allowing AP1 to know what packets were received by the STA.

Link enablement may occur, as illustrated at (10), with an L2 update provided to the controller. This update may indicate, to the controller, that AP2 is (or will be) hosting the client STA so it can start to forward DL data to AP2, as illustrated at (11), without disabling its link with AP1. Not disabling the link to AP1 may allow AP1 to continue to deliver packets to the STA while the controller begins to route packets through AP2. In other words, the DL data may be buffered at AP2.

As illustrated at (12), because the link with AP1 is not disabled, AP1 may flush its remaining queued packets. AP1 may attempt to flush all or just some of its packets. In some cases, whether AP1 flushes all or just some may depend on various factors, such as link quality. For example, if link quality is at or above a threshold value, AP1 may decide to flush all its packets. If link quality is not good, AP1 may attempt to flush what it can, subject to a deadline (or timeout value). As noted above, the goal may be for seamlessness to a user. Thus, the decision on how much/how to flush may depend on quality of service (QoS) and/or other considerations. In some cases, the STA may indicate in the RAI a preference that AP1 considers when deciding how much to flush. For example, if moving to the target quickly is more important to the STA (and some packet loss is tolerable), the STA may indicate a deadline (timeout value) in the RAI. In such cases, switching the STA to AP2 may be considered more important than flushing all the packets. STA may indicate this as part of the RAI, for example, by indicating a deadline. In such cases, AP1 may attempt to flush packets, but only up to the time out indicated by the deadline.

As indicated at (13), after flushing DL packets, AP1 may indicate that the STA may disable the link to AP1 and/or may enable a link to AP2. In some cases, one or both of these indications may be provided in a response to the RAI, which may be referred to as a roaming announcement response (RAR). As indicated at (14), once a link to AP2 is enabled, the controller and STA may exchange UL/DL data, via AP2. As illustrated at (15), in this state, the link with AP1 is disabled and the link with AP2 is enabled.

As illustrated at (16), in some cases, AP1 may send a block acknowledgment request (BAR) to STA. This BAR may help avoid a STA getting stuck with a sequence number if not all packets are flushed at (12). A BAR may allow the STA to reply with an indication of which packets were received and avoid holes/missing packets in the sequence number space.

As noted above, a timeout may help if a link is bad and there are several retries, which would add latency to the handover. The timeout may allow AP1 to give up on the rest of the packets after some timeout. The timeout (deadline) value may be determined based on how quickly client desires to move from AP1 to AP2. Different use case scenarios may impact the timeout value. For example, in an XR use case, switching quickly may be more important and some amount of packet loss may be tolerable.

FIG. 12 depicts an example call flow 1200 for a station initiated handover in a multi-radio scenario, in accordance with certain aspects of the present disclosure. The example assumes a STA 1220 initiates a handover from source AP1 1210-1 to a target AP2 1210-2, that are both affiliated with an SMD MLD and a controller 1230.

As illustrated, operations (1)-(8) may be the same or similar as those described above with reference to call flow 1100 of FIG. 11. Having multiple radios, however, enables different operation after the STA sends the RAI to announce the station initiated handover. For example, as illustrated at (9), link enablement for AP2 may happen (immediately) without waiting until after the context transfer at (9a), allowing the controller to begin forwarding DL data to AP2, as illustrated at (10).

Given the multiple radios, a link with AP2 may be enabled, as illustrated at (11). As noted above, AP2 link enable may be indicated in a RAR message. As illustrated at (12), in this state, a link with AP1 and a link with AP2 are both enabled. Thus, both AP1 and AP2 may send DL data. As indicated at (13), once a link to AP2 is enabled, the controller and STA may exchange both UL and DL data with the STA, via AP2.

In some cases, the STA may send an acknowledgment (ACK) to AP1 to indicate it successfully received the RAR message. In such cases, AP1 may notify AP2 if it received the ACK for RAR from STA or not. If AP1 does not receive an ACK (delivery of the RAR message failed) AP2 may include information that might have been provided in the RAR message, so that the STA can still properly set up the state as if it had received the RAR message from AP1.

Given the multiple radios of the client STA, draining of DL packets from AP1, as illustrated at (14) may take place simultaneously with serving of DL/UL packets to/from AP2. As noted above, there may be a timeout mechanism to stop attempts to flush DL data from AP1 after some time period. In some cases, to hasten completion of the handover, after the AP2 link is enabled, UL traffic may only be sent to AP2.

As indicated at (15), after flushing DL packets, AP1 may indicate that the STA may disable the link to AP1. As illustrated at (16), in this state, a link with AP1 is disabled, a link with AP2 is enabled, and the controller routes DL traffic to the STA via AP2. As illustrated at (17), in some cases, AP1 may send a block acknowledgment request (BAR) to STA. As noted above with reference to FIG. 11, a BAR may help avoid a STA getting stuck with a sequence number if not all packets are flushed at (14). A BAR may allow the STA to reply with an indication of which packets were received and avoid holes/missing packets in the sequence number space.

In some cases, a multiple radio scenario may utilize a different timeout than the single radio scenario. For example, the handover deadline may be more relaxed, since AP2 can start serving the STA sooner, without having to wait on AP1 (as in the single radio scenario).

Figure 13:
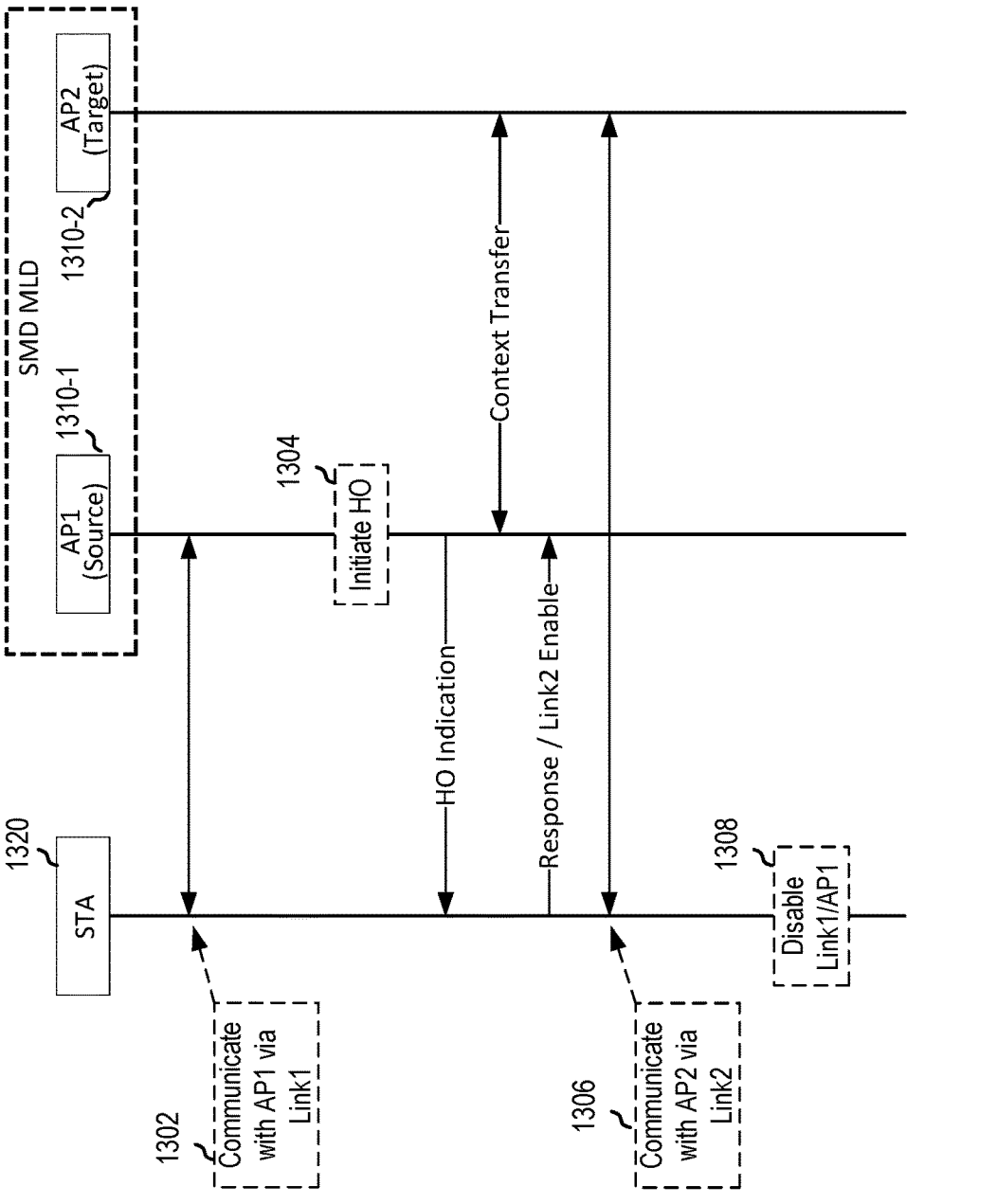
FIG. 13 depicts an example call flow for a network initiated handover, in accordance with certain aspects of the present disclosure.

FIG. 13 depicts an example call flow for a network initiated handover, in accordance with certain aspects of the present disclosure. The example assumes a network initiated handover of a STA 1320 from source AP1 1310-1 to a target AP2 1310-2, that are both affiliated with an SMD MLD. The signaling is similar to that shown in FIG. 10, except source AP1 assumes the role of HO initiator. In other words, AP1 sends the HO indication to the STA and the STA sends a corresponding Response. Network initiated handover may have benefits, for example, as APs may have consider information the STA may not have, such as overall network loading and/or relative loading of one or more potential target APs.

As illustrated at 1302, similarly to the scenario illustrated in FIG. 10, the STA may initially be in communication with AP1 via Link1. As illustrated at 1304, AP1 may then initiate an HO, and may send an HO indication to the STA (e.g., via a RAI message). After transmitting the HO indication, AP1 may transfer context to AP2, to prepare AP2 to serve the STA. In this case, the STA may signal AP1 (e.g., via a RAR message) when it is ready to enable Link 2 (e.g., after draining UL packets to AP1). As illustrated at 1306, after transmitting the response, the STA may communicate with AP2 via Link 2. As illustrated at 1308, the STA may disable Link 1 with AP1.

Figure 14:
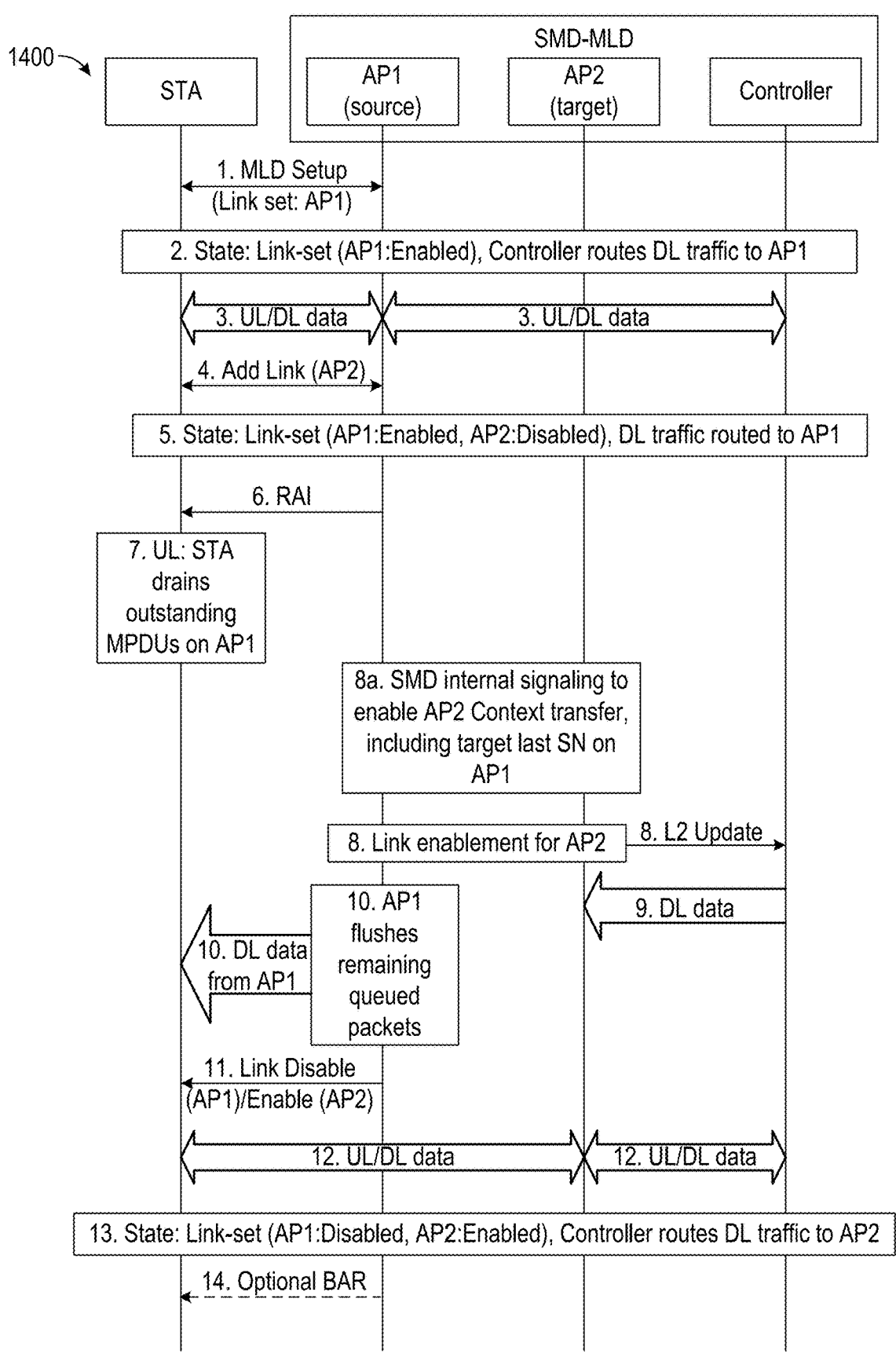
FIG. 14 depicts an example call flow for a network initiated handover in a single radio scenario, in accordance with certain aspects of the present disclosure.
Figure 15:
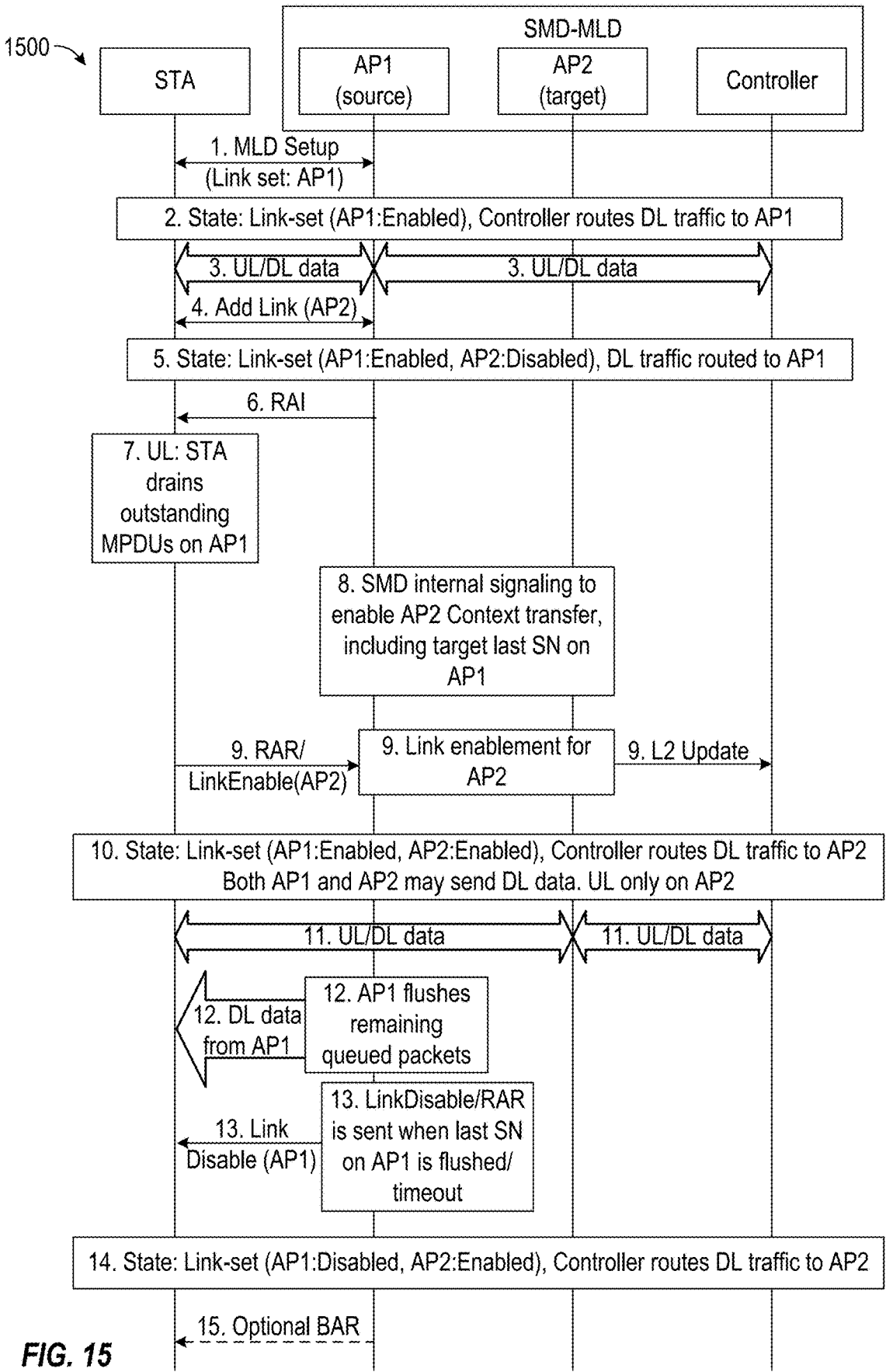
FIG. 15 depicts an example call flow for a network initiated handover in a multi-radio scenario, in accordance with certain aspects of the present disclosure.

While the call flow diagram 1300 is a relatively high level depiction of a network initiated HO, call flow diagrams 1400 of FIGS. 14 and 1500 of FIG. 15 provide additional signaling details for examples scenarios assuming a single radio STA and multi-radio STA, respectively. For example, call flows 1400 and 1500 include additional details regarding interactions between AP1 and AP2 with a controller of the SMD MLD.

FIG. 14 depicts an example call flow for a network initiated handover in a single radio scenario, in accordance with certain aspects of the present disclosure. The example assumes a network initiated handover of a STA 1420 from source AP1 1410-1 to a target AP2 1410-2, that are both affiliated with an SMD MLD and a controller 1430.

As illustrated, operations (1)-(5) may be the same or similar as those described above with reference to call flow 1100 and 1200 of FIG. 11 and FIG. 12. As illustrated at (6), however, AP1 sends the RAI. As illustrated at (7), the STA may drain outstanding MPDUs to AP1.

As illustrated at (8a), after AP1 sends the RAI, context transfer to AP2 may be enabled via SMD internal signaling. Link enablement may occur, as illustrated at (8), with an L2 update provided to the controller, indicating that AP2 is (will be) hosting the client STA so it can start to forward DL data to AP2, as illustrated at (9). As illustrated at (10), AP1 may flush its remaining queued packets.

As indicated at (11), after flushing DL packets, AP1 may indicate that the STA may disable the link to AP1 and/or may enable a link to AP2. As indicated at (12), once a link to AP2 is enabled, the controller and STA may exchange UL/DL data, via AP2. As illustrated at (13), in this state, a link with AP1 is disabled and a link with AP2 is enabled. As illustrated at (14), in some cases, AP1 may send a block acknowledgment request (BAR) to STA. This BAR may help avoid a STA getting stuck with a sequence number if not all packets are flushed at (10). A BAR may allow the STA to reply with an indication of which packets were received and avoid holes/missing packets in the sequence number space. As in the scenarios described above, certain operations may be subject to a timeout, for example as determined by a handover deadline. For example, the RAI may indicate a deadline that determines how long the STA attempts to drain MPDUS at (7).

FIG. 15 depicts an example call flow for a network initiated handover in a multi-radio scenario, in accordance with certain aspects of the present disclosure. The example assumes a network initiated handover of a STA 1520 from source AP1 1510-1 to a target AP2 1510-2, that are both affiliated with an SMD MLD and a controller 1530.

As illustrated, operations (1)-(8) may be the same or similar as those described above with reference to call flow 1400 of FIG. 14. Having multiple radios, however, enables different operation after AP1 sends the RAI to announce the network initiated handover. For example, as illustrated at (9), link enablement for AP2 may happen after the STA drains MPDUs, via a RAR message from the STA, resulting in a state with a link with AP1 and a link with AP2 both enabled, as illustrated at (10). Enabling the link for AP2 allows the controller to begin forwarding DL data to AP2, as illustrated at (11). In some cases, the client may send the RAR and AP1 may send a link enable for AP2.

Given the multiple radios of the client STA, draining of DL packets from AP1, as illustrated at (12) may take place simultaneously with serving of DL/UL packets to/from AP2. As noted above, there may be a timeout mechanism to stop attempts to flush DL data from AP1 after some time period. In some cases, to hasten completion of the handover, after the AP2 link is enabled, UL traffic may only be sent to AP2.

As indicated at (13), after flushing DL packets, AP1 may indicate that the STA may disable the link to AP1. As illustrated at (14), in this state, a link with AP1 is disabled, a link with AP2 is enabled, and the controller routes DL traffic to the STA via AP2. As illustrated at (15), in some cases, AP1 may send a block acknowledgment request (BAR) to STA. As noted above, a BAR may help avoid a STA getting stuck with a sequence number if not all packets are flushed at (12).

Similar to the scenarios described above, the RAI may indicate an HO_deadline, which may be used to set a timeout mechanism, for example, for the STA flushing MPDUs at (7). In some cases, the STA may receive an ACK for the RAR sent at (9). If the ACK is not received, there are various options for how to proceed. For example, AP1 may have a timeout mechanism to wait for the RAR after sending out RAI. Assuming this timeout mechanism is triggered (times out after a first timeout period, timeout1), AP1 may send what may be considered a "potential" link enablement to AP2, so that AP2 is ready to receive packets from STA after a waiting period of time, referred to as PT2. If this period passes and AP2 does not receive a RAR from STA, then AP2 may remove the link enablement.

In some cases, the STA may send a RAR to AP2 after a second timeout period timeout2, if it does not receive an ACK from AP1. Timeout2 may be set to be later than timeout1, so that the STA will only send a RAR to AP2 after AP2 is ready. But this timeout2 may be set to expire earlier than timeout1 plus PT2, so that AP2 does not exit the waiting period before STA sends the RAR. After AP2 receives an RAR from the STA, AP2 should inform AP1 and continue the L2 update with controller. After being informed, AP1 may continue to perform operations at (12) and (13), which may also have timeout mechanisms.

Example Operations

FIG. 16 shows an example of a method 1600 for wireless communication at a first wireless station. In some examples, the first wireless station is a station, such as STA 120 of FIGS. 1 and 2.

Method 1600 begins at step 1605 with communicating, via a first link, with a first AP affiliated with a MLD. In some cases, the operations of this step refer to, or may be performed by, circuitry for communicating and/or code for communicating as described with reference to FIG. 23.

Method 1600 then proceeds to step 1610 with enabling a second link with a second AP affiliated with the MLD. In some cases, the operations of this step refer to, or may be performed by, circuitry for enabling and/or code for enabling as described with reference to FIG. 23.

Method 1600 then proceeds to step 1615 with communicating, during a handover of the first wireless station from the first AP to the second AP, with the first AP via the first link and with the second AP via the second link. In some cases, the operations of this step refer to, or may be performed by, circuitry for communicating and/or code for communicating as described with reference to FIG. 23.

Method 1600 then proceeds to step 1620 with disabling the first link with the first AP after completion of the handover. In some cases, the operations of this step refer to, or may be performed by, circuitry for disabling and/or code for disabling as described with reference to FIG. 23.

In some aspects, the second link is a member of an associated link set when the second link is enabled.

In some aspects, the method 1600 further includes adding, to the associated link set, a third link associated with a third AP affiliated with the MLD. In some cases, the operations of this step refer to, or may be performed by, circuitry for adding and/or code for adding as described with reference to FIG. 23.

In some aspects, the method 1600 further includes removing, from the associated link set, a fourth link associated with a fourth AP affiliated with the MLD. In some cases, the operations of this step refer to, or may be performed by, circuitry for removing and/or code for removing as described with reference to FIG. 23.

In some aspects, the method 1600 further includes obtaining a beacon from the first AP. In some cases, the operations of this step refer to, or may be performed by, circuitry for obtaining and/or code for obtaining as described with reference to FIG. 23.

In some aspects, the method 1600 further includes identifying at least the second AP and third AP based on information in the beacon. In some cases, the operations of this step refer to, or may be performed by, circuitry for identifying and/or code for identifying as described with reference to FIG. 23.

In some aspects, the communicating, during the handover, with the first AP via the first link and with the second AP via the second link comprises at least one of: obtaining duplicate first packets via both the first link and the second link; or outputting duplicate second packets for transmission via both the first link and second link.

In some aspects, the method 1600 further includes obtaining signaling from the first AP indicating the wireless station is to enable the second link, wherein the wireless station enables the second link after obtaining the signaling. In some cases, the operations of this step refer to, or may be performed by, circuitry for obtaining and/or code for obtaining as described with reference to FIG. 23.

In some aspects, the method 1600 further includes outputting, for transmission, signaling to the first AP initiating the handover, wherein the wireless station enables the second link after outputting the signaling. In some cases, the operations of this step refer to, or may be performed by, circuitry for outputting and/or code for outputting as described with reference to FIG. 23.

In some aspects, the method 1600 further includes obtaining signaling from the second AP indicating the wireless station is to disable the first link, wherein the wireless station disables the first link after obtaining the signaling. In some cases, the operations of this step refer to, or may be performed by, circuitry for obtaining and/or code for obtaining as described with reference to FIG. 23.

Figure 23:
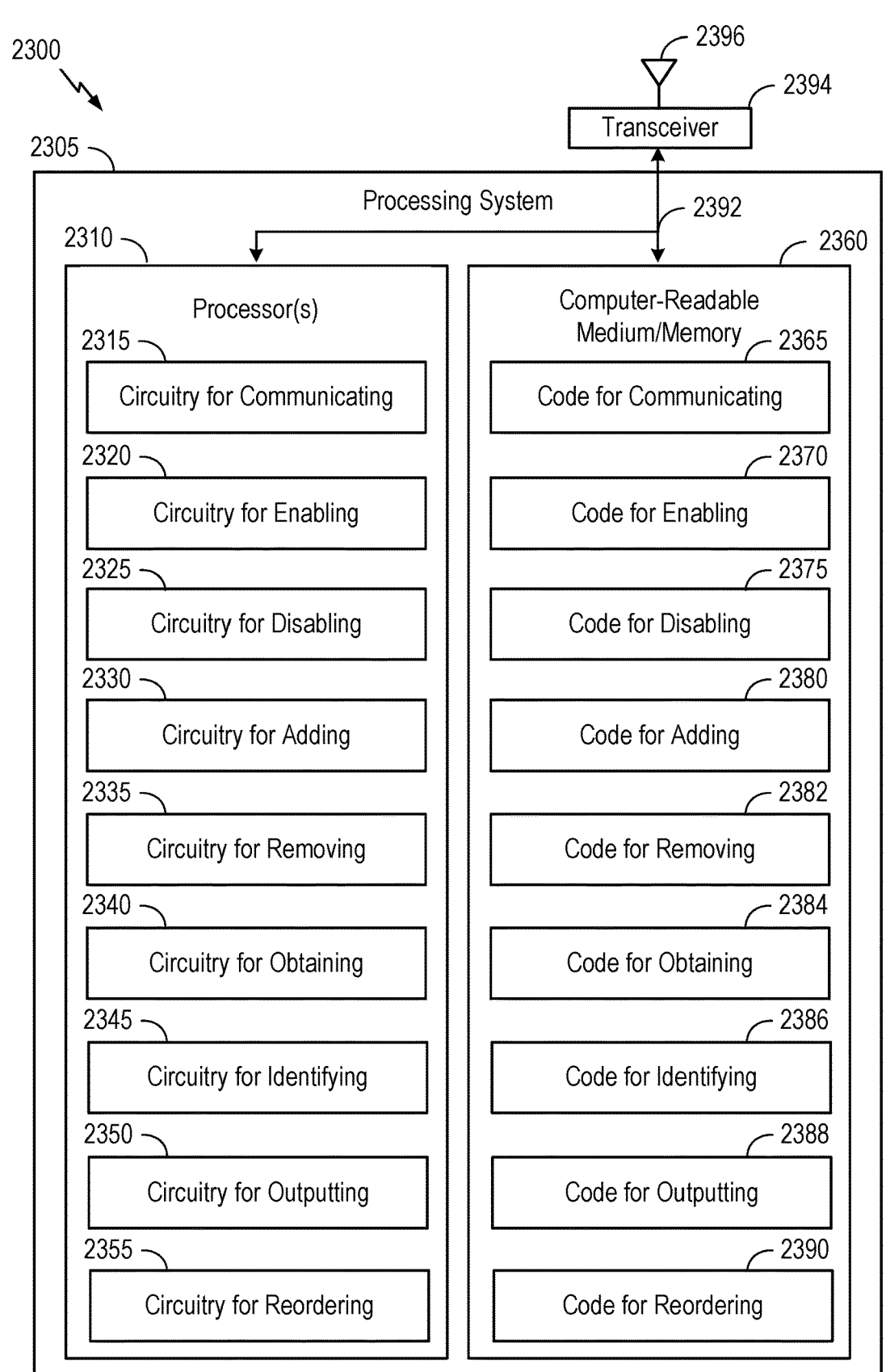
FIG. 23 depicts a block diagram of an example wireless communications device.

In one aspect, method 1600, or any aspect related to it, may be performed by an apparatus, such as communications device 2300 of FIG. 23, which includes various components operable, configured, or adapted to perform the method 1600. Communications device 2300 is described below in further detail.

Note that FIG. 16 is just one example of a method, and other methods including fewer, additional, or alternative steps are possible consistent with this disclosure.

FIG. 17 shows an example of a method 1700 for wireless communication at a first AP. In some examples, the first AP is an access point, such as an AP 110 of FIGS. 1 and 2.

Method 1700 begins at step 1705 with communicating, via a first link, with a wireless station during a handover of the wireless station from the first AP to a second AP, wherein the wireless station is associated with a MLD with which the first AP and second AP are both affiliated. In some cases, the operations of this step refer to, or may be performed by, circuitry for communicating and/or code for communicating as described with reference to FIG. 23.

Method 1700 then proceeds to step 1710 with outputting, for transmission to the second AP, context information for the MLD. In some cases, the operations of this step refer to, or may be performed by, circuitry for outputting and/or code for outputting as described with reference to FIG. 23.

Method 1700 then proceeds to step 1715 with disabling the first link with the first wireless station after the handover. In some cases, the operations of this step refer to, or may be performed by, circuitry for disabling and/or code for disabling as described with reference to FIG. 23.

In some aspects, the context information for the MLD comprises information regarding at least one of: association context, security context, or TID to link mapping, one or more BA sessions, a downlink packet buffer, an uplink packet re-ordering buffer, a SN, or a PN.

In some aspects, the method 1700 further includes outputting for transmission a beacon identifying at least the second AP. In some cases, the operations of this step refer to, or may be performed by, circuitry for outputting and/or code for outputting as described with reference to FIG. 23.

In some aspects, communicating with the wireless station during the handover comprises at least one of: outputting duplicate first packets for transmission to both the wireless station via the first link and to the second AP; or obtaining duplicate second packets from both the wireless station via the first link and from the second AP.

In some aspects, the method 1700 further includes reordering the duplicate second packets. In some cases, the operations of this step refer to, or may be performed by, circuitry for reordering and/or code for reordering as described with reference to FIG. 23.

In some aspects, the method 1700 further includes outputting signaling to the wireless station indicating the wireless station is to disable the first link for communicating with the second AP. In some cases, the operations of this step refer to, or may be performed by, circuitry for outputting and/or code for outputting as described with reference to FIG. 23.

In some aspects, the method 1700 further includes obtaining signaling from the wireless station initiating the handover. In some cases, the operations of this step refer to, or may be performed by, circuitry for obtaining and/or code for obtaining as described with reference to FIG. 23.

In some aspects, the method 1700 further includes obtaining signaling from the second AP indicating the handover is complete. In some cases, the operations of this step refer to, or may be performed by, circuitry for obtaining and/or code for obtaining as described with reference to FIG. 23.

In some aspects, the context information for the MLD is output for transmission based on at least one of a timer or uplink sequence number.

In one aspect, method 1700, or any aspect related to it, may be performed by an apparatus, such as communications device 2300 of FIG. 23, which includes various components operable, configured, or adapted to perform the method 1700. Communications device 2300 is described below in further detail.

Note that FIG. 17 is just one example of a method, and other methods including fewer, additional, or alternative steps are possible consistent with this disclosure.

Figure 18:
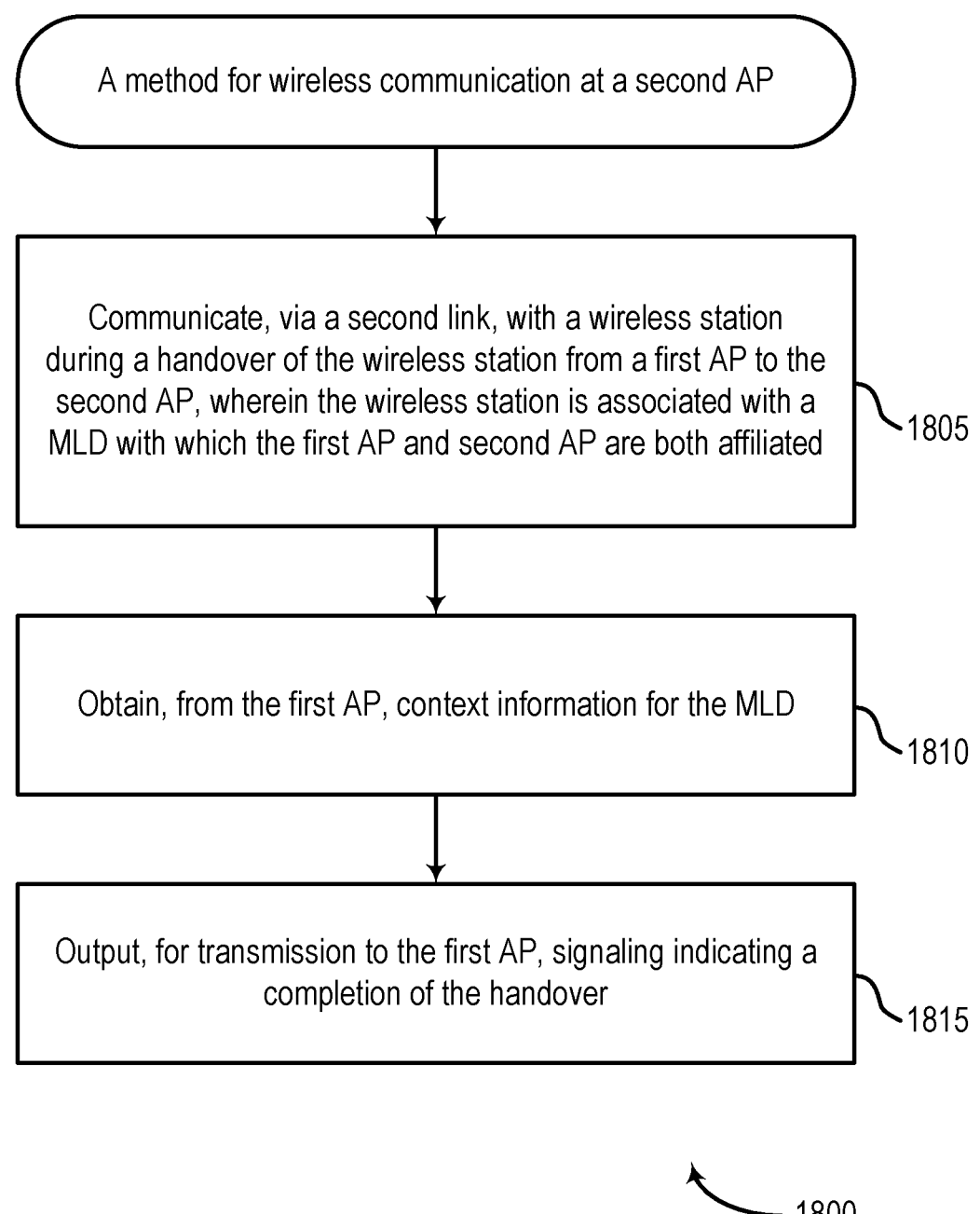
FIG. 18 depicts a flowchart illustrating an example method for wireless communication.

FIG. 18 shows an example of a method 1800 for wireless communication at a second AP. In some examples, the second AP is an access point, such as an AP 110 of FIGS. 1 and 2.

Method 1800 begins at step 1805 with communicating, via a second link, with a wireless station during a handover of the wireless station from a first AP to the second AP, wherein the wireless station is associated with a MLD with which the first AP and second AP are both affiliated. In some cases, the operations of this step refer to, or may be performed by, circuitry for communicating and/or code for communicating as described with reference to FIG. 23.

Method 1800 then proceeds to step 1810 with obtaining, from the first AP, context information for the MLD. In some cases, the operations of this step refer to, or may be performed by, circuitry for obtaining and/or code for obtaining as described with reference to FIG. 23.

Method 1800 then proceeds to step 1815 with outputting, for transmission to the first AP, signaling indicating a completion of the handover. In some cases, the operations of this step refer to, or may be performed by, circuitry for outputting and/or code for outputting as described with reference to FIG. 23.

In some aspects, the context information for the MLD comprises information regarding at least one of: association context, security context, or TID to link mapping, one or more BA sessions, a downlink packet buffer, an uplink packet re-ordering buffer, a SN, or a PN.

In some aspects, the method 1800 further includes outputting for transmission a beacon identifying one or more neighbor APs of the second AP. In some cases, the operations of this step refer to, or may be performed by, circuitry for outputting and/or code for outputting as described with reference to FIG. 23.

In some aspects, communicating with the wireless station during the handover comprises at least one of: outputting duplicate packets for transmission to both the wireless station via the second link and to the first AP; or obtaining duplicate packets from both the wireless station via the second link and from the first AP.

In some aspects, the method 1800 further includes outputting, for transmission, the duplicate packets to the first AP for reordering. In some cases, the operations of this step refer to, or may be performed by, circuitry for outputting and/or code for outputting as described with reference to FIG. 23.

In some aspects, the method 1800 further includes outputting, for transmission, signaling to the first AP indicating the handover is complete. In some cases, the operations of this step refer to, or may be performed by, circuitry for outputting and/or code for outputting as described with reference to FIG. 23.

In some aspects, the method 1800 further includes outputting, for transmission, signaling for a gateway to switch a data path from the first AP to the second AP. In some cases, the operations of this step refer to, or may be performed by, circuitry for outputting and/or code for outputting as described with reference to FIG. 23.

In one aspect, method 1800, or any aspect related to it, may be performed by an apparatus, such as communications device 2300 of FIG. 23, which includes various components operable, configured, or adapted to perform the method 1800. Communications device 2300 is described below in further detail.

Note that FIG. 18 is just one example of a method, and other methods including fewer, additional, or alternative steps are possible consistent with this disclosure.

FIG. 19 shows an example of a method 1900 of wireless communication at a wireless node. In some examples, the wireless node is a station, such as a STA 120 of FIGS. 1 and 2. In some examples, the wireless node is an access point, such as an AP 110 of FIGS. 1 and 2.

Method 1900 begins at step 1905 with communicating, via a first link, with a first access point (AP) device affiliated with a single mobility domain (SMD) entity. In some cases, the operations of this step refer to, or may be performed by, circuitry for communicating and/or code for communicating as described with reference to FIG. 23.

Method 1900 then proceeds to step 1910 with outputting, for transmission to the first AP device, a first message including a first indication that the wireless node is initiating a handover of the wireless node from the first AP device to a second AP device affiliated with the SMD entity. In some cases, the operations of this step refer to, or may be performed by, circuitry for outputting and/or code for outputting as described with reference to FIG. 23.

Method 1900 then proceeds to step 1915 with communicating with the second AP device via a second link during the handover after obtaining a second indication that context information has been transferred from the first AP device to the second AP device. In some cases, the operations of this step refer to, or may be performed by, circuitry for communicating and/or code for communicating as described with reference to FIG. 23.

Method 1900 then proceeds to step 1920 with disabling the first link with the first AP device after obtaining a third indication that triggers the wireless node to disable the first link with the first AP device. In some cases, the operations of this step refer to, or may be performed by, circuitry for disabling and/or code for disabling as described with reference to FIG. 23.

In some aspects, the first message comprises a roaming announcement initiation (RAI) message.

In some aspects, the second indication and the third indication are received via a single message.

In some aspects, the first message also includes a fourth indication of a deadline for completing the handover.

In some aspects, the method 1900 further includes obtaining, prior to communicating with the second AP device, a second message via the first link, wherein the second message acknowledges the first indication. In some cases, the operations of this step refer to, or may be performed by, circuitry for obtaining and/or code for obtaining as described with reference to FIG. 23.

In some aspects, the method 1900 further includes obtaining one or more packets from the first AP device after outputting the first message for transmission. In some cases, the operations of this step refer to, or may be performed by, circuitry for obtaining and/or code for obtaining as described with reference to FIG. 23.

In some aspects, the method 1900 further includes obtaining a block acknowledgment (BA) request (BAR) from the first AP device. In some cases, the operations of this step refer to, or may be performed by, circuitry for obtaining and/or code for obtaining as described with reference to FIG. 23.

In some aspects, the method 1900 further includes outputting, for transmission in response to the BAR, a BA indicating sequence numbers (SNs) of the one or more packets. In some cases, the operations of this step refer to, or may be performed by, circuitry for outputting and/or code for outputting as described with reference to FIG. 23.

In some aspects, the communicating with the second AP device via a second link occurs prior to the disabling of the first link.

In one aspect, method 1900, or any aspect related to it, may be performed by an apparatus, such as communications device 2300 of FIG. 23, which includes various components operable, configured, or adapted to perform the method 1900. Communications device 2300 is described below in further detail.

Note that FIG. 19 is just one example of a method, and other methods including fewer, additional, or alternative steps are possible consistent with this disclosure.

Figure 20:
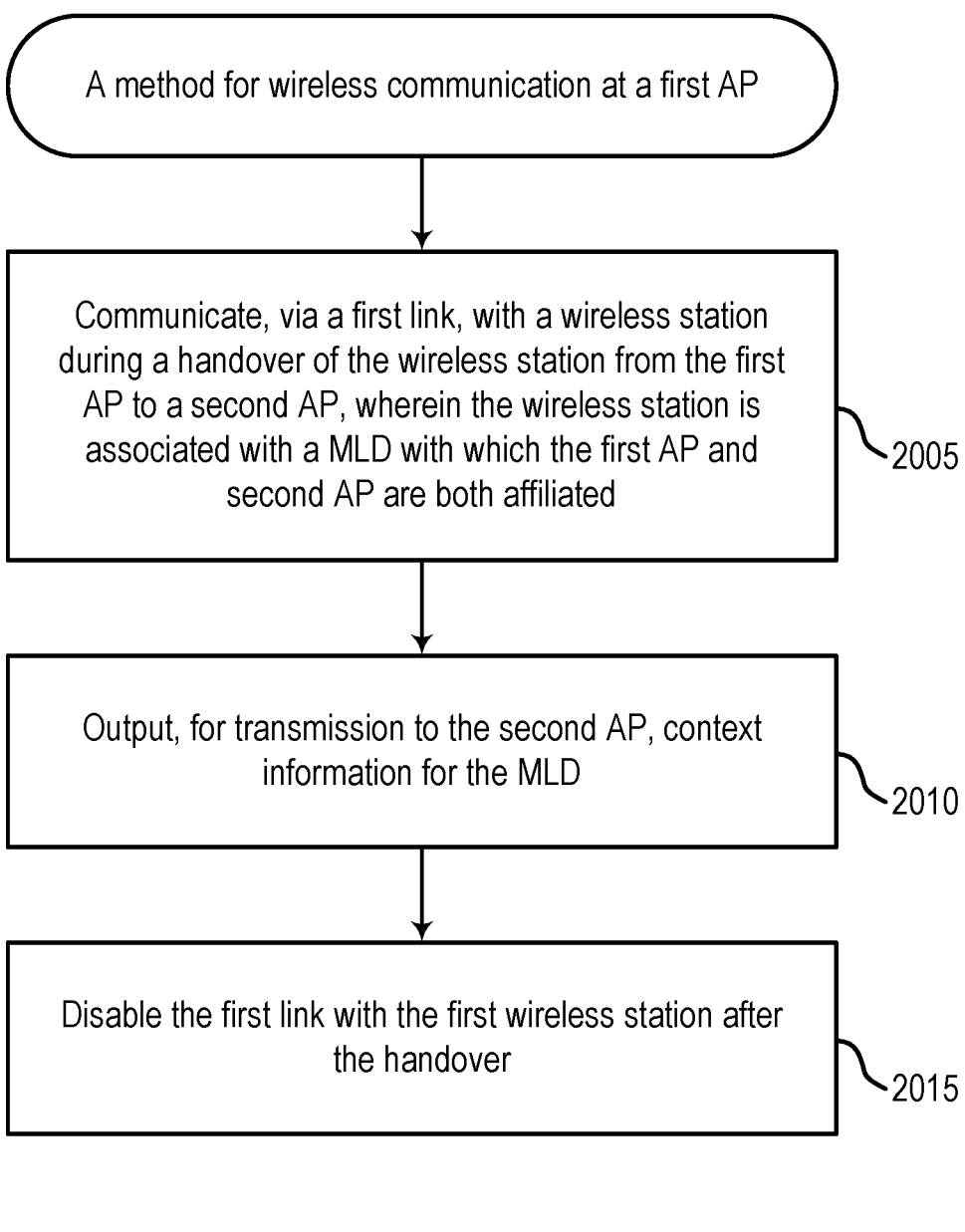
FIG. 20 depicts a flowchart illustrating an example method for wireless communication.

FIG. 20 shows an example of a method 2000 of wireless communication at a first access point (AP) device, such as an AP 110 of FIGS. 1 and 2.

Method 2000 begins at step 2005 with communicating, via a first link, with a wireless node affiliated with a single mobility domain (SMD) entity with which the first AP device and a second AP device are also both affiliated. In some cases, the operations of this step refer to, or may be performed by, circuitry for communicating and/or code for communicating as described with reference to FIG. 23.

Method 2000 then proceeds to step 2010 with obtaining, from the wireless node, a first message including a first indication that the wireless node is initiating a handover of the wireless node from the first AP device to the second AP device. In some cases, the operations of this step refer to, or may be performed by, circuitry for obtaining and/or code for obtaining as described with reference to FIG. 23.

Method 2000 then proceeds to step 2015 with outputting, for transmission to the second AP device, context information after obtaining the first message. In some cases, the operations of this step refer to, or may be performed by, circuitry for outputting and/or code for outputting as described with reference to FIG. 23.

Method 2000 then proceeds to step 2020 with outputting, for transmission to the wireless node, a second indication that triggers the wireless node to enable a second link with the second AP device. In some cases, the operations of this step refer to, or may be performed by, circuitry for outputting and/or code for outputting as described with reference to FIG. 23.

Method 2000 then proceeds to step 2025 with outputting, for transmission to the wireless node, a third indication that triggers the wireless node to disable the first link with the first AP device. In some cases, the operations of this step refer to, or may be performed by, circuitry for outputting and/or code for outputting as described with reference to FIG. 23.

In some aspects, the first message comprises a roaming announcement initiation (RAI) message.

In some aspects, the context information comprises information regarding at least one of: association context, security context, or traffic identifier (TID) to link mapping, one or more block acknowledgment (BA) sessions, a downlink packet buffer, an uplink packet re-ordering buffer, a sequence number (SN), or a packet number (PN).

In some aspects, the second indication and the third indication are transmitted via a single message.

In some aspects, the method 2000 further includes outputting, for transmission to the wireless node, a second message acknowledging the first indication prior to transmitting the first indication. In some cases, the operations of this step refer to, or may be performed by, circuitry for outputting and/or code for outputting as described with reference to FIG. 23.

In some aspects, the method 2000 further includes outputting, for transmission, one or more packets from a queue to the wireless node to drain the (e.g., downlink) queue before completion of the handover, after obtaining the first message. In some cases, the operations of this step refer to, or may be performed by, circuitry for outputting and/or code for outputting as described with reference to FIG. 23.

In some aspects, the method 2000 further includes outputting, for transmission, a block acknowledgment (BA) request (BAR) to the wireless node. In some cases, the operations of this step refer to, or may be performed by, circuitry for outputting and/or code for outputting as described with reference to FIG. 23.

In some aspects, the method 2000 further includes obtaining, in response to the BAR, a BA indicating whether the wireless node received one or more packets with corresponding one or more sequence numbers (SNs). In some cases, the operations of this step refer to, or may be performed by, circuitry for obtaining and/or code for obtaining as described with reference to FIG. 23.

In some aspects, the method 2000 further includes including information from the BA in the context information output for transmission to the second AP device. In some cases, the operations of this step refer to, or may be performed by, circuitry for including and/or code for including as described with reference to FIG. 23.

In some aspects, at least one of: the first message also includes an indication of a deadline for completing the handover; and the deadline indicates how long the first AP device attempts to transmit one or more packets from a queue to the wireless node; or the queue is empty before completion of the handover.

In some aspects, the second indication is output for transmission prior to outputting, for transmission, the third indication.

In one aspect, method 2000, or any aspect related to it, may be performed by an apparatus, such as communications device 2300 of FIG. 23, which includes various components operable, configured, or adapted to perform the method 2000. Communications device 2300 is described below in further detail.

Note that FIG. 20 is just one example of a method, and other methods including fewer, additional, or alternative steps are possible consistent with this disclosure.

FIG. 21 shows an example of a method 2100 of wireless communication at a wireless node. In some examples, the wireless node is a station, such as a STA 120 of FIGS. 1 and 2. In some examples, the wireless node is an access point, such as an AP 110 of FIGS. 1 and 2.

Method 2100 begins at step 2105 with communicating, via a first link, with a first access point (AP) device affiliated with a single mobility domain (SMD) entity. In some cases, the operations of this step refer to, or may be performed by, circuitry for communicating and/or code for communicating as described with reference to FIG. 23.

Method 2100 then proceeds to step 2110 with obtaining, from the first AP device, a first message including a first indication that the wireless node is to handover from the first AP device to a second AP device that is also affiliated with the SMD entity. In some cases, the operations of this step refer to, or may be performed by, circuitry for obtaining and/or code for obtaining as described with reference to FIG. 23.

Method 2100 then proceeds to step 2115 with communicating with the second AP device via a second link during the handover after obtaining or outputting, for transmission, a second indication. In some cases, the operations of this step refer to, or may be performed by, circuitry for communicating and/or code for communicating as described with reference to FIG. 23.

Method 2100 then proceeds to step 2120 with disabling the first link with the first AP device after obtaining a third indication. In some cases, the operations of this step refer to, or may be performed by, circuitry for disabling and/or code for disabling as described with reference to FIG. 23.

In some aspects, the first message comprises a roaming announcement initiation (RAI) message.

In some aspects, the second indication and third indication are received via a single message.

In some aspects, the method 2100 further includes obtaining a second message acknowledging the first indication prior to communicating with the second AP device via the second link. In some cases, the operations of this step refer to, or may be performed by, circuitry for obtaining and/or code for obtaining as described with reference to FIG. 23.

In some aspects, the method 2100 further includes obtaining one or more packets from the first AP device after obtaining the first message. In some cases, the operations of this step refer to, or may be performed by, circuitry for obtaining and/or code for obtaining as described with reference to FIG. 23.

In some aspects, the method 2100 further includes obtaining a block acknowledgment (BA) request (BAR) from the first AP device. In some cases, the operations of this step refer to, or may be performed by, circuitry for obtaining and/or code for obtaining as described with reference to FIG. 23.

In some aspects, the method 2100 further includes outputting, for transmission in response to the BAR, a BA indicating one or more sequence numbers (SNs) of the one or more packets. In some cases, the operations of this step refer to, or may be performed by, circuitry for outputting and/or code for outputting as described with reference to FIG. 23.

In some aspects, the communicating with the second AP device via a second link occurs prior to disabling the first link.

In some aspects, the method 2100 further includes outputting, for transmission, one or more packets to the first AP device after obtaining the first message. In some cases, the operations of this step refer to, or may be performed by, circuitry for outputting and/or code for outputting as described with reference to FIG. 23.

In some aspects, the first message also includes an indication of a deadline for completing the handover; and the deadline indicates how long the outputting, for transmission, of the one or more packets should be attempted.

In one aspect, method 2100, or any aspect related to it, may be performed by an apparatus, such as communications device 2300 of FIG. 23, which includes various components operable, configured, or adapted to perform the method 2100. Communications device 2300 is described below in further detail.

Note that FIG. 21 is just one example of a method, and other methods including fewer, additional, or alternative steps are possible consistent with this disclosure.

Figure 22:
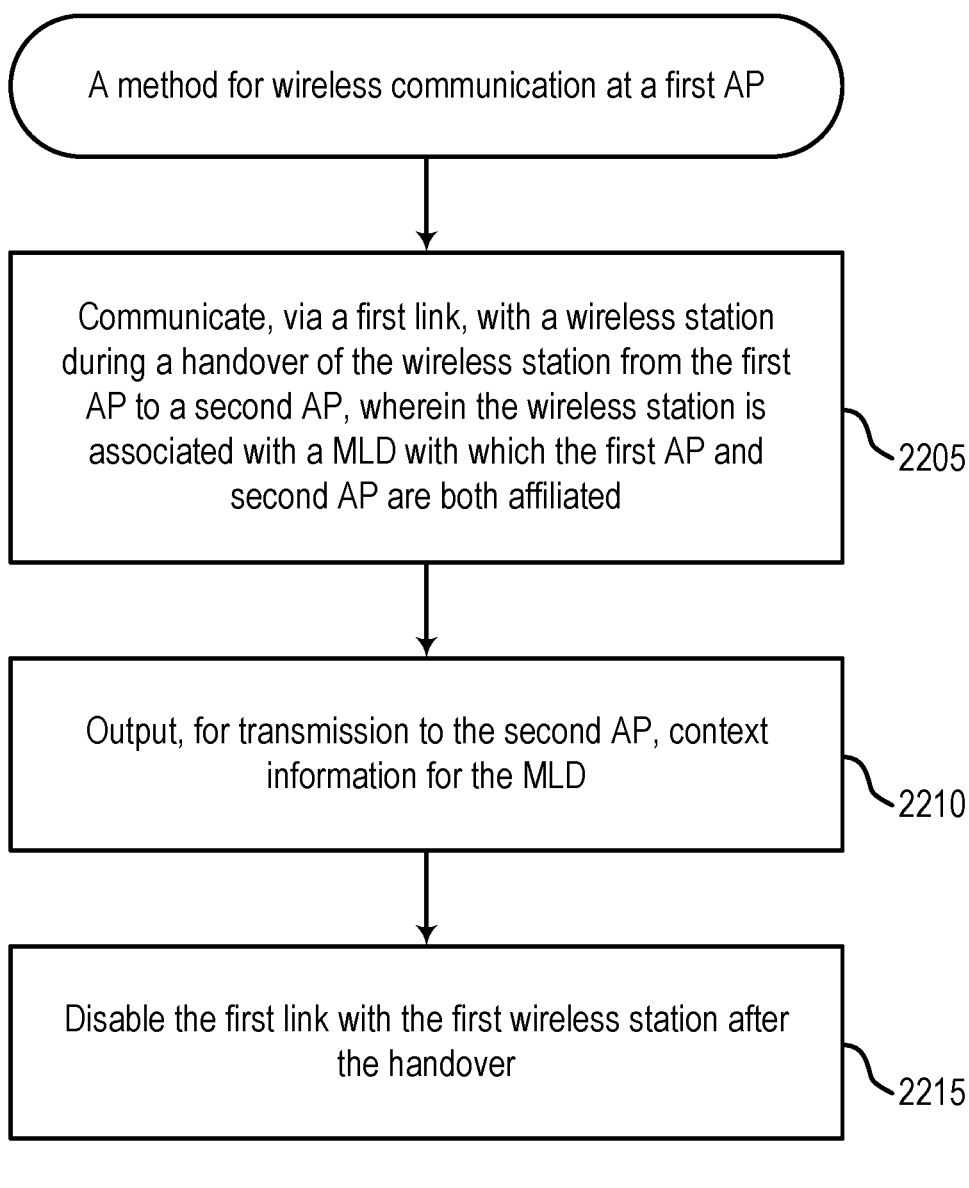
FIG. 22 depicts a flowchart illustrating an example method for wireless communication.

FIG. 22 shows an example of a method 2200 of wireless communication at a first access point (AP) device, such as an AP 110 of FIGS. 1 and 2.

Method 2200 begins at step 2205 with communicating, via a first link, with a wireless node affiliated with a single mobility domain (SMD) entity with which the first AP device and a second AP device are also both affiliated. In some cases, the operations of this step refer to, or may be performed by, circuitry for communicating and/or code for communicating as described with reference to FIG. 23.

Method 2200 then proceeds to step 2210 with outputting, for transmission to the wireless node, a first message including a first indication that the wireless node is initiating a handover of the wireless node from the first AP device to the second AP device. In some cases, the operations of this step refer to, or may be performed by, circuitry for outputting and/or code for outputting as described with reference to FIG. 23.

Method 2200 then proceeds to step 2215 with outputting, for transmission to the second AP device, context information after transmitting the first message. In some cases, the operations of this step refer to, or may be performed by, circuitry for outputting and/or code for outputting as described with reference to FIG. 23.

Method 2200 then proceeds to step 2220 with outputting, for transmission to the wireless node, a second indication for the wireless node to enable a second link with the second AP device. In some cases, the operations of this step refer to, or may be performed by, circuitry for outputting and/or code for outputting as described with reference to FIG. 23.

In some aspects, the first message comprises a roaming announcement initiation (RAI) message.

In some aspects, the context information comprises information regarding at least one of: association context, security context, or traffic identifier (TID) to link mapping, one or more block acknowledgment (BA) sessions, a downlink packet buffer, an uplink packet re-ordering buffer, a sequence number (SN), or a packet number (PN).

In some aspects, the method 2200 further includes outputting, for transmission to the wireless node, a third indication for the wireless node to disable the first link with the first AP device. In some cases, the operations of this step refer to, or may be performed by, circuitry for outputting and/or code for outputting as described with reference to FIG. 23.

In some aspects, the second indication and third indication are transmitted via a single message.

In some aspects, the second indication is output for transmission prior to outputting, for transmission, the third indication.

In some aspects, the method 2200 further includes obtaining, from the wireless node, a second message acknowledging the first indication prior to outputting, for transmission, the second indication. In some cases, the operations of this step refer to, or may be performed by, circuitry for obtaining and/or code for obtaining as described with reference to FIG. 23.

In some aspects, the method 2200 further includes outputting, for transmission, one or more packets to the wireless node after obtaining the first message. In some cases, the operations of this step refer to, or may be performed by, circuitry for outputting and/or code for outputting as described with reference to FIG. 23.

In some aspects, the method 2200 further includes outputting, for transmission, a block acknowledgment (BA) request (BAR) to the wireless node. In some cases, the operations of this step refer to, or may be performed by, circuitry for outputting and/or code for outputting as described with reference to FIG. 23.

In some aspects, the method 2200 further includes obtaining, in response to the BAR, a BA indicating whether the wireless node received one or more of the packets with corresponding sequence numbers (SNs). In some cases, the operations of this step refer to, or may be performed by, circuitry for obtaining and/or code for obtaining as described with reference to FIG. 23.

In some aspects, the method 2200 further includes including information from the BAR in the context information output for transmission to the second AP device. In some cases, the operations of this step refer to, or may be performed by, circuitry for including and/or code for including as described with reference to FIG. 23.

In some aspects, the first message also includes a fourth indication of a deadline for completing the handover; and the deadline indicates how long the outputting, for transmission, of the one or more packets should be attempted.

In one aspect, method 2200, or any aspect related to it, may be performed by an apparatus, such as communications device 2300 of FIG. 23, which includes various components operable, configured, or adapted to perform the method 2200. Communications device 2300 is described below in further detail.

Note that FIG. 22 is just one example of a method, and other methods including fewer, additional, or alternative steps are possible consistent with this disclosure.

Example Communications Device

FIG. 23 depicts aspects of an example communications device 2300. In some aspects, communications device 2300 is a station, such as a STA 120 described above with respect to FIGS. 1 and 2. In some aspects, communications device 2300 is an AP, such as an AP 110 described above with respect to FIGS. 1 and 2.

The communications device 2300 includes a processing system 2305 coupled to the transceiver 2394 (e.g., a transmitter and/or a receiver). The transceiver 2394 is configured to transmit and receive signals for the communications device 2300 via the antenna 2396, such as the various signals as described herein. The transceiver 2394 may be an example of aspects of transceiver 222 and/or transceiver 254 described with reference to FIG. 2. The processing system 2305 may be configured to perform processing functions for the communications device 2300, including processing signals received and/or to be transmitted by the communications device 2300.

The processing system 2305 includes one or more processors 2310. In various aspects, the one or more processors 2310 may be representative of the RX data processor 270, the TX data processor 288, the TX spatial processor 290, or the controller 280 of STA 120 illustrated in FIG. 2. In various aspects, the one or more processors 2310 may be representative of one or more of the RX data processor 242, the TX data processor 210, the TX spatial processor 220, or the controller 230 of AP 110 illustrated in FIG. 2. The one or more processors 2310 are coupled to a computer-readable medium/memory 2360 via a bus 2392. In certain aspects, the computer-readable medium/memory 2360 is configured to store instructions (e.g., computer-executable code) that when executed by the one or more processors 2310, cause the one or more processors 2310 to perform: the method 1600 described with respect to FIG. 16, or any aspect related to it; the method 1700 described with respect to FIG. 17, or any aspect related to it; and/or the method 1800 described with respect to FIG. 18, or any aspect related to it. Note that reference to a processor performing a function of communications device 2300 may include one or more processors 2310 performing that function of communications device 2300.

In the depicted example, computer-readable medium/ memory 2360 stores code (e.g., executable instructions), such as code for communicating 2365, code for enabling 2370, code for disabling 2375, code for adding 2380, code for removing 2382, code for obtaining 2384, code for identifying 2386, code for outputting 2388, and code for reordering 2390. Processing of the code for communicating 2365, code for enabling 2370, code for disabling 2375, code for adding 2380, code for removing 2382, code for obtaining 2384, code for identifying 2386, code for outputting 2388, and code for reordering 2390 may cause the communications device 2300 to perform: the method 1600 described with respect to FIG. 16, or any aspect related to it; the method 1700 described with respect to FIG. 17, or any aspect related to it; and/or the method 1800 described with respect to FIG. 18, or any aspect related to it.

The one or more processors 2310 include circuitry configured to implement (e.g., execute) the code stored in the computer-readable medium/memory 2360, including circuitry such as circuitry for communicating 2315, circuitry for enabling 2320, circuitry for disabling 2325, circuitry for adding 2330, circuitry for removing 2335, circuitry for obtaining 2340, circuitry for identifying 2345, circuitry for outputting 2350, and circuitry for reordering 2355. Processing with circuitry for communicating 2315, circuitry for enabling 2320, circuitry for disabling 2325, circuitry for adding 2330, circuitry for removing 2335, circuitry for obtaining 2340, circuitry for identifying 2345, circuitry for outputting 2350, and circuitry for reordering 2355 may cause the communications device 2300 to perform: the method 1600 described with respect to FIG. 16, or any aspect related to it; the method 1700 described with respect to FIG. 17, or any aspect related to it; and/or the method 1800 described with respect to FIG. 18, or any aspect related to it.

Various components of the communications device 2300 may provide means for performing: the method 1600 described with respect to FIG. 16, or any aspect related to it; the method 1700 described with respect to FIG. 17, or any aspect related to it; and/or the method 1800 described with respect to FIG. 18, or any aspect related to it. For example, in some cases, means for transmitting, sending or outputting for transmission may include the transmitter unit 254 or antenna(s) 252 of the STA 120 illustrated in FIG. 2 and/or the transceiver 2394 and the antenna 2396 of the communications device 2300 in FIG. 23. In some cases, means for transmitting, sending or outputting for transmission may include the transmitter unit 222 or an antenna(s) 224 of AP 110 illustrated in FIG. 2 and/or the transceiver 2394 and the antenna 2396 of the communications device 2300 in FIG. 23. In some aspects, means for receiving or obtaining may include the receiver unit 254 or antenna(s) 252 of STA 120 illustrated in FIG. 2 and/or the transceiver 2394 and the antenna 2396 of the communications device 2300 in FIG. 23. In some aspects, means for receiving or obtaining may include the receiver unit 222 or an antenna(s) 224 of AP 110 illustrated in FIG. 2 and/or the transceiver 2394 and the antenna 2396 of the communications device 2300 in FIG.

23. In some aspects, means for communicating, means for including, means for enabling, means for disabling, means for adding, means for removing, means for obtaining, means for identifying, means for outputting, and/or means for reordering may comprise one or more processors, such as one or more of the processors described above with reference to FIGS. 2 and/or 23.

Example Clauses

Implementation examples are described in the following numbered clauses:

Clause 1: A method for wireless communication at a first wireless node, comprising: communicating, via a first link, with a first AP affiliated with a MLD; enabling a second link with a second AP device affiliated with the MLD; communicating, during a handover of the first wireless node from the first AP to the second AP device, with the first AP via the first link and with the second AP device via the second link; and disabling the first link with the first AP after completion of the handover.

Clause 2: The method of Clause 1, wherein the second link is a member of an associated link set when the second link is enabled.

Clause 3: The method of Clause 2, further comprising at least one of: adding, to the associated link set, a third link associated with a third AP affiliated with the MLD; or removing, from the associated link set, a fourth link associated with a fourth AP affiliated with the MLD.

Clause 4: The method of Clause 3, further comprising: obtaining a beacon from the first AP; and identifying at least the second AP device and third AP based on information in the beacon.

Clause 5: The method of any one of Clauses 1-4, wherein the communicating, during the handover, with the first AP via the first link and with the second AP device via the second link comprises at least one of: obtaining duplicate first packets via both the first link and the second link; or outputting duplicate second packets for transmission via both the first link and second link.

Clause 6: The method of any one of Clauses 1-5, further comprising: obtaining signaling from the first AP indicating the wireless node is to enable the second link, wherein the wireless node enables the second link after obtaining the signaling.

Clause 7: The method of any one of Clauses 1-6, further comprising: outputting, for transmission, signaling to the first AP initiating the handover, wherein the wireless node enables the second link after outputting the signaling.

Clause 8: The method of any one of Clauses 1-7, further comprising: obtaining signaling from the second AP device indicating the wireless node is to disable the first link, wherein the wireless node disables the first link after obtaining the signaling.

Clause 9: A method for wireless communication at a first AP device, comprising: communicating, via a first link, with a wireless node during a handover of the wireless node from the first AP device to a second AP device, wherein the wireless node is associated with a MLD with which the first AP device and second AP device are both affiliated; outputting, for transmission to the second AP device, context information for the MLD; and disabling the first link with the first wireless node after the handover.

Clause 10: The method of Clause 9, wherein the context information for the MLD comprises information regarding at least one of: association context, security context, or TID to link mapping, one or more BA sessions, a downlink packet buffer, an uplink packet re-ordering buffer, a SN, or a PN.

Clause 11: The method of any one of Clauses 9 and 10, further comprising: outputting for transmission a beacon identifying at least the second AP device.

Clause 12: The method of any one of Clauses 9-11, wherein communicating with the wireless node during the handover comprises at least one of: outputting duplicate first packets for transmission to both the wireless node via the first link and to the second AP device; or obtaining duplicate second packets from both the wireless node via the first link and from the second AP device.

Clause 13: The method of Clause 12, further comprising: reordering the duplicate second packets.

Clause 14: The method of any one of Clauses 9-13, further comprising: outputting signaling to the wireless node indicating the wireless node is to disable the first link for communicating with the second AP device.

Clause 15: The method of any one of Clauses 9-14, further comprising: obtaining signaling from the wireless node initiating the handover.

Clause 16: The method of any one of Clauses 9-15, further comprising: obtaining signaling from the second AP device indicating the handover is complete.

Clause 17: The method of any one of Clauses 9-16, wherein the context information for the MLD is output for transmission based on at least one of a timer or uplink sequence number.

Clause 18: A method for wireless communication at a second AP device, comprising: communicating, via a second link, with a wireless node during a handover of the wireless node from a first AP device to the second AP device, wherein the wireless node is associated with a MLD with which the first AP device and second AP device are both affiliated; obtaining, from the first AP device, context information for the MLD; and outputting, for transmission to the first AP device, signaling indicating a completion of the handover.

Clause 19: The method of Clause 18, wherein the context information for the MLD comprises information regarding at least one of: association context, security context, or TID to link mapping, one or more BA sessions, a downlink packet buffer, an uplink packet re-ordering buffer, a SN, or a PN.

Clause 20: The method of any one of Clauses 18 and 19, further comprising: outputting for transmission a beacon identifying one or more neighbor APs of the second AP device.

Clause 21: The method of any one of Clauses 18-20, wherein communicating with the wireless node during the handover comprises at least one of: outputting duplicate packets for transmission to both the wireless node via the second link and to the first AP device; or obtaining duplicate packets from both the wireless node via the second link and from the first AP device.

Clause 22: The method of Clause 21, further comprising: outputting, for transmission, the duplicate packets to the first AP device for reordering.

Clause 23: The method of any one of Clauses 18-22, further comprising: outputting, for transmission, signaling to the first AP device indicating the handover is complete.

Clause 24: The method of any one of Clauses 18-23, further comprising: outputting, for transmission, signaling for a gateway to switch a data path from the first AP device to the second AP device.

Clause 25: An apparatus, comprising: a memory comprising executable instructions; and a processor configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by a processor of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Clause 29: A first wireless station, comprising: at least one transceiver; a memory comprising instructions; and one or more processors configured to execute the instructions and cause the wireless node to perform a method in accordance with any one of Clauses 1-8, wherein the at least one transceiver is configured to transmit the waveform.

Clause 30: A first AP device, comprising: at least one transceiver; a memory comprising instructions; and one or more processors configured to execute the instructions and cause the wireless node to perform a method in accordance with any one of Clauses 9-17, wherein the at least one transceiver is configured to transmit the waveform.

Clause 31: A second AP device, comprising: at least one transceiver; a memory comprising instructions; and one or more processors configured to execute the instructions and cause the wireless node to perform a method in accordance with any one of Clauses 18-23, wherein the at least one transceiver is configured to transmit the waveform.

Clause 32: A method for wireless communication at a wireless node, comprising: communicating, via a first link, with a first access point (AP) device affiliated with a single mobility domain (SMD) entity; outputting, for transmission to the first AP device, a first message including a first indication that the wireless node is initiating a handover of the wireless node from the first AP device to a second AP device affiliated with the SMD entity; communicating with the second AP device via a second link during the handover after obtaining a second indication that context information has been transferred from the first AP device to the second AP device; and disabling the first link with the first AP device after obtaining a third indication that triggers the wireless node to disable the first link with the first AP device.

Clause 33: The method of Clause 32, wherein the first message comprises a roaming announcement initiation (RAI) message.

Clause 34: The method of any one of Clauses 32-33, wherein the second indication and the third indication are received via a single message.

Clause 35: The method of any one of Clauses 32-34, wherein the first message also includes a fourth indication of a deadline for completing the handover.

Clause 36: The method of any one of Clauses 32-35, further comprising: obtaining, prior to communicating with the second AP device, a second message via the first link, wherein the second message acknowledges the first indication.

Clause 37: The method of any one of Clauses 32-36, further comprising: obtaining one or more packets from the first AP device after outputting the first message for transmission.

Clause 38: The method of Clause 37, further comprising: obtaining a block acknowledgment (BA) request (BAR) from the first AP device; and outputting, for transmission in response to the BAR, a BA indicating sequence numbers (SNs) of the one or more packets.

Clause 39: The method of any one of Clauses 32-38, wherein the communicating with the second AP device via a second link occurs prior to the disabling of the first link.

Clause 40: A method for wireless communication at a first access point (AP) device, comprising: communicating, via a first link, with a wireless node affiliated with a single mobility domain (SMD) entity with which the first AP device and a second AP device are also both affiliated; obtaining, from the wireless node, a first message including a first indication that the wireless node is initiating a handover of the wireless node from the first AP device to the second AP device; outputting, for transmission to the second AP device, context information after obtaining the first message; outputting, for transmission to the wireless node, a second indication that triggers the wireless node to enable a second link with the second AP device; and outputting, for transmission to the wireless node, a third indication that triggers the wireless node to disable the first link with the first AP device.

Clause 41: The method of Clause 40, wherein the first message comprises a roaming announcement initiation (RAI) message.

Clause 42: The method of any one of Clauses 40-41, wherein the context information comprises information regarding at least one of: association context, security context, or traffic identifier (TID) to link mapping, one or more block acknowledgment (BA) sessions, a downlink packet buffer, an uplink packet re-ordering buffer, a sequence number (SN), or a packet number (PN).

Clause 43: The method of any one of Clauses 40-42, wherein the second indication and the third indication are transmitted via a single message.

Clause 44: The method of any one of Clauses 40-43, further comprising: outputting, for transmission to the wireless node, a second message acknowledging the first indication prior to transmitting the first indication.

Clause 45: The method of any one of Clauses 40-44, further comprising: outputting, for transmission, one or more packets from a queue to the wireless node to drain the queue before completion of the handover, after obtaining the first message.

Clause 46: The method of any one of Clauses 40-45, further comprising: outputting, for transmission, a block acknowledgment (BA) request (BAR) to the wireless node; obtaining, in response to the BAR, a BA indicating whether the wireless node received one or more packets with corresponding one or more sequence numbers (SNs); and including information from the BA in the context information output for transmission to the second AP device.

Clause 47: The method of any one of Clauses 40-46, wherein at least one of: the first message also includes an indication of a deadline for completing the handover; and the deadline indicates how long the first AP device attempts to transmit one or more packets from a queue to the wireless node; or the queue is empty before completion of the handover.

Clause 48: The method of any one of Clauses 40-47, wherein the second indication is output for transmission prior to outputting, for transmission, the third indication.

Clause 49: A method for wireless communication at a wireless node, comprising: communicating, via a first link, with a first access point (AP) device affiliated with a single mobility domain (SMD) entity; obtaining, from the first AP device, a first message including a first indication that the wireless node is to handover from the first AP device to a second AP device that is also affiliated with the SMD entity; communicating with the second AP device via a second link during the handover after obtaining or outputting, for transmission, a second indication; and disabling the first link with the first AP device after obtaining a third indication.

Clause 50: The method of Clause 49, wherein the first message comprises a roaming announcement initiation (RAI) message.

Clause 51: The method of any one of Clauses 49-50, wherein the second indication and third indication are received via a single message.

Clause 52: The method of any one of Clauses 49-51, further comprising: obtaining a second message acknowledging the first indication prior to communicating with the second AP device via the second link.

Clause 53: The method of any one of Clauses 49-52, further comprising: obtaining one or more packets from the first AP device after obtaining the first message.

Clause 54: The method of Clause 53, further comprising: obtaining a block acknowledgment (BA) request (BAR) from the first AP device; and outputting, for transmission in response to the BAR, a BA indicating one or more sequence numbers (SNs) of the one or more packets.

Clause 55: The method of any one of Clauses 49-54, wherein the communicating with the second AP device via a second link occurs prior to disabling the first link.

Clause 56: The method of any one of Clauses 49-55, further comprising: outputting, for transmission, one or more packets to the first AP device after obtaining the first message.

Clause 57: The method of Clause 56, wherein: the first message also includes an indication of a deadline for completing the handover; and the deadline indicates how long the outputting, for transmission, of the one or more packets should be attempted.

Clause 58: A method for wireless communication at a first access point (AP) device, comprising: communicating, via a first link, with a wireless node affiliated with a single mobility domain (SMD) entity with which the first AP device and a second AP device are also both affiliated; outputting, for transmission to the wireless node, a first message including a first indication that the wireless node is initiating a handover of the wireless node from the first AP device to the second AP device; outputting, for transmission to the second AP device, context information after transmitting the first message; and outputting, for transmission to the wireless node, a second indication for the wireless node to enable a second link with the second AP device.

Clause 59: The method of Clause 58, wherein the first message comprises a roaming announcement initiation (RAI) message.

Clause 60: The method of any one of Clauses 58-59, wherein the context information comprises information regarding at least one of: association context, security context, or traffic identifier (TID) to link mapping, one or more block acknowledgment (BA) sessions, a downlink packet buffer, an uplink packet re-ordering buffer, a sequence number (SN), or a packet number (PN).

Clause 61: The method of any one of Clauses 58-60, further comprising: outputting, for transmission to the wireless node, a third indication for the wireless node to disable the first link with the first AP device.

Clause 62: The method of Clause 61, wherein the second indication and third indication are transmitted via a single message.

Clause 63: The method of Clause 61, wherein the second indication is output for transmission prior to outputting, for transmission, the third indication.

Clause 64: The method of any one of Clauses 58-63, further comprising: obtaining, from the wireless node, a second message acknowledging the first indication prior to outputting, for transmission, the second indication.

Clause 65: The method of any one of Clauses 58-64, further comprising: outputting, for transmission, one or more packets to the wireless node after obtaining the first message.

Clause 66: The method of Clause 65, further comprising: outputting, for transmission, a block acknowledgment (BA) request (BAR) to the wireless node; obtaining, in response to the BAR, a BA indicating whether the wireless node received one or more of the packets with corresponding sequence numbers (SNs); and including information from the BAR in the context information output for transmission to the second AP device.

Clause 67: The method of Clause 65, wherein: the first message also includes a fourth indication of a deadline for completing the handover; and the deadline indicates how long the outputting, for transmission, of the one or more packets should be attempted.

Clause 68: The method of any one of Clauses 1-67, wherein the first AP device and the second AP device are non-collocated.

Clause 69: An apparatus, comprising: a memory comprising executable instructions; and a processor configured to execute the executable instructions and cause the apparatus to perform a method in accordance with any one of Clauses 1-67.

Clause 70: An apparatus, comprising means for performing a method in accordance with any one of Clauses 1-67.

Clause 71: A non-transitory computer-readable medium comprising executable instructions that, when executed by a processor of an apparatus, cause the apparatus to perform a method in accordance with any one of Clauses 1-67.

Clause 72: A computer program product embodied on a computer-readable storage medium comprising code for performing a method in accordance with any one of Clauses 1-67.

Clause 73: A wireless node, comprising: at least one transceiver; a memory comprising instructions; and one or more processors configured to execute the instructions and cause the wireless node to perform a method in accordance with any one of Clauses 32-39, wherein the at least one transceiver is configured to transmit the first message.

Clause 74: A first AP device, comprising: at least one transceiver; a memory comprising instructions; and one or more processors configured to execute the instructions and cause the wireless node to perform a method in accordance with any one of Clauses 40-48, wherein the at least one transceiver is configured to receive the first message and transmit the context information.

Clause 75: A wireless node, comprising: at least one transceiver; a memory comprising instructions; and one or more processors configured to execute the instructions and cause the wireless node to perform a method in accordance with any one of Clauses 49-57, wherein the at least one transceiver is configured to receive the first message.

Clause 76: A first AP device, comprising: at least one transceiver; a memory comprising instructions; and one or more processors configured to execute the instructions and cause the wireless node to perform a method in accordance with any one of Clauses 58-67, wherein the at least one transceiver is configured to transmit the first message and transmit the context information.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
at least one transceiver;
one or more memories comprising computer-executable instructions; and
one or more processors configured to execute the computer-executable instructions to cause the apparatus to:
communicate, via the at least one transceiver using a first link, with a first access point (AP) device affiliated with a single mobility domain (SMD) entity;
transmit, to the first AP device via the at least one transceiver, a first message including a first indication that the apparatus is initiating a handover of the apparatus from the first AP device to a second AP device affiliated with the SMD entity;
communicate, via the at least one transceiver, with the second AP device using a second link during the handover after a second indication is received that indicates that context information has been transferred from the first AP device to the second AP device; and
disable the first link with the first AP device after a third indication is received that triggers the apparatus to disable the first link with the first AP device.

2. The apparatus of claim 1, wherein the first message comprises a roaming announcement initiation (RAI) message.

3. The apparatus of claim 1, wherein at least one of:
the one or more processors are configured to cause the apparatus to receive the second indication and the third indication are received via a single message; or
the first message also includes a fourth indication of a deadline for completing the handover.

4. The apparatus of claim 1, wherein:
the one or more processors are further configured to cause the apparatus to receive, via the at least one transceiver prior to the communication with the second AP device, a second message using the first link; and
the second message acknowledges the first indication.

5. The apparatus of claim 1, wherein the one or more processors are further configured to cause the apparatus to receive, via the one or more transceivers, one or more packets from the first AP device after transmission of the first message.

6. The apparatus of claim 5, wherein the one or more processors are further configured to cause the apparatus to:
receive, via the at least one transceiver, a block acknowledgment (BA) request (BAR) from the first AP device; and
transmit, via the at least one transceiver in response to the BAR, a BA indicating sequence numbers (SNs) of the one or more packets.

7. The apparatus of claim 1, wherein the one or more processors are configured to cause the apparatus to communicate with the second AP device using a second link prior to the disablement of the first link.

8. The apparatus of claim 1, wherein the apparatus is configured as a wireless station.

9. A method for wireless communication by a wireless station, comprising:
communicating, using a first link, with a first access point (AP) device affiliated with a single mobility domain (SMD) entity;
transmitting, to the first AP device, a first message including a first indication that the wireless station is initiating a handover of the wireless station from the first AP device to a second AP device affiliated with the SMD entity;
communicating with the second AP device using a second link during the handover after receiving a second indication that context information has been transferred from the first AP device to the second AP device; and
disabling the first link with the first AP device after receiving a third indication that triggers the wireless station to disable the first link with the first AP device.

10. The method of claim 9, wherein the first message comprises a roaming announcement initiation (RAI) message.

11. The method of claim 9, wherein the second indication and the third indication are received via a single message.

12. The method of claim 9, wherein the first message also includes a fourth indication of a deadline for completing the handover.

13. The method of claim 9, further comprising receiving, prior to the communication with the second AP device, a second message using the first link, wherein the second message acknowledges the first indication.

14. The method of claim 9, further comprising receiving one or more packets from the first AP device after transmitting the first message.

15. The method of claim 14, further comprising:
receiving a block acknowledgment (BA) request (BAR) from the first AP device; and transmitting, in response to the BAR, a BA indicating sequence numbers (SNs) of the one or more packets.

16. The method of claim 9, wherein communicating with the second AP device comprises communicating with the second AP using a second link prior to disabling the first link.

17. An apparatus for wireless communication, comprising:

means for communicating, using a first link, with a first access point (AP) device affiliated with a single mobility domain (SMD) entity;

means for transmitting, to the first AP device, a first message including a first indication that the apparatus is initiating a handover of the apparatus from the first AP device to a second AP device affiliated with the SMD entity;

means for communicating with the second AP device using a second link during the handover after receiving a second indication that context information has been transferred from the first AP device to the second AP device; and means for disabling the first link with the first AP device after receiving a third indication that triggers the apparatus to disable the first link with the first AP device.

18. The apparatus of claim 17, wherein the first message comprises a roaming announcement initiation (RAI) message.

19. The apparatus of claim 17, further comprising means for receiving the second indication and the third indication via a single message.

20. The apparatus of claim 17, wherein the first message also includes a fourth indication of a deadline for completing the handover.

21. The apparatus of claim 17, further comprising means for receiving, prior to the communication with the second AP device, a second message using the first link, wherein the second message acknowledges the first indication.

22. The apparatus of claim 17, further comprising means for receiving one or more packets from the first AP device after transmitting the first message.

23. The apparatus of claim 22, further comprising:

means for receiving a block acknowledgment (BA) request (BAR) from the first AP device; and means for transmitting, in response to the BAR, a BA indicating sequence numbers (SNs) of the one or more packets.

24. The apparatus of claim 17, wherein the means for communicating with the second AP device comprises means for communicating with the second AP using a second link prior to disabling the first link.

25. A non-transitory computer-readable medium for wireless communication by a wireless station, comprising:

instructions that, when executed by one or more processors, cause the wireless station to:

communicate, using a first link, with a first access point (AP) device affiliated with a single mobility domain (SMD) entity;

transmit, to the first AP device, a first message including a first indication that the wireless station is initiating a handover of the wireless station from the first AP device to a second AP device affiliated with the SMD entity;

communicate with the second AP device using a second link during the handover after receiving a second indication that context information has been transferred from the first AP device to the second AP device; and disable the first link with the first AP device after receiving a third indication that triggers the wireless station to disable the first link with the first AP device.

26. The non-transitory computer-readable medium of claim 25, wherein the first message comprises a roaming announcement initiation (RAI) message.

27. The non-transitory computer-readable medium of claim 25, further comprising instructions that, when executed by the one or more processors, cause the wireless station to receive the second indication and the third indication via a single message.

28. The non-transitory computer-readable medium of claim 25, wherein the first message also includes a fourth indication of a deadline for completing the handover.

29. The non-transitory computer-readable medium of claim 25, further comprising instructions that, when executed by the one or more processors, cause the wireless station to receive, prior to the communication with the second AP device, a second message using the first link, wherein the second message acknowledges the first indication.

30. The non-transitory computer-readable medium of claim 25, further comprising instructions that, when executed by the one or more processors, cause the wireless station to receive one or more packets from the first AP device after transmitting the first message.

31. The non-transitory computer-readable medium of claim 30, further comprising instructions that, when executed by the one or more processors, cause the wireless station to:

receive a block acknowledgment (BA) request (BAR) from the first AP device; and transmit, in response to the BAR, a BA indicating sequence numbers (SNs) of the one or more packets.

32. The non-transitory computer-readable medium of claim 25, wherein the instructions that cause the wireless station to communicate with the second AP device comprise instructions that cause the wireless station to communicate with the second AP using a second link prior to disabling the first link.

* * * * *